US012012007B2

(12) United States Patent
Vahedi et al.

(10) Patent No.: US 12,012,007 B2
(45) Date of Patent: Jun. 18, 2024

(54) ELECTRIC VEHICLE BATTERY CHARGER

(71) Applicant: DCBEL INC., Montréal (CA)

(72) Inventors: Hani Vahedi, Brossard (CA);
Marc-André Forget, Saint Lazare (CA); Peter Ibrahim, Westmount (CA)

( * ) Notice: Subject to any disclaimer, the term of this patent is extended or adjusted under 35 U.S.C. 154(b) by 17 days.

(21) Appl. No.: 17/588,705

(22) Filed: Jan. 31, 2022

(65) Prior Publication Data
US 2022/0153148 A1 May 19, 2022

Related U.S. Application Data

(63) Continuation of application No. 16/901,445, filed on Jun. 15, 2020, now Pat. No. 11,273,718, which is a (Continued)

(30) Foreign Application Priority Data

Oct. 13, 2017 (WO) ................ PCT/CA2017/051218

(51) Int. Cl.
*B60L 53/10* (2019.01)
*B60L 53/302* (2019.01)
(Continued)

(52) U.S. Cl.
CPC ............. *B60L 53/11* (2019.02); *B60L 53/302* (2019.02); *H02J 7/00714* (2020.01); *H02J 7/02* (2013.01);
(Continued)

(58) Field of Classification Search
CPC .............................. B60L 53/302; B60L 53/311
(Continued)

(56) References Cited

U.S. PATENT DOCUMENTS 3,317,810 A 5/1967 Inoue
4,472,672 A 9/1984 Pacholok
(Continued)

FOREIGN PATENT DOCUMENTS

CN 101752620 A 6/2010
CN 102130626 A 7/2011
(Continued)

OTHER PUBLICATIONS

Vahedi Hani et al : "A Novel Multilevel Multioutput Bidirectional Active Buck PFC Rectifier" IEEE Transactions on Industrial Electronics, IEEE Service Center, Piscataway, NJ, USA, vol. 63, No. 9, pp. 5442-5450, dated Sep. 1, 2016.
(Continued)

*Primary Examiner* — Jerry D Robbins
(74) *Attorney, Agent, or Firm* — Anglehart et al.

(57) ABSTRACT

A battery charger capable of receiving AC power and delivering both AC and DC power to an electric power storage battery in accordance to different embodiments disclosed herein using a rectifier circuit supplying the DC load and absorbing power as a five-level active rectifier with low harmonics on the AC input. In one aspect, the battery charger may have a bidirectional rectifier/inverter converter providing power conversion between a DC source and AC enabling the user to not only charge an electrical vehicle ("EV") but also convert the energy charged in the EV/battery or solar panel to AC for use.

11 Claims, 26 Drawing Sheets

Related U.S. Application Data continuation of application No. 16/677,147, filed on Nov. 7, 2019, now Pat. No. 10,759,287, which is a continuation-in-part of application No. PCT/CA2018/051291, filed on Oct. 12, 2018.

(60) Provisional application No. 62/817,104, filed on Mar. 12, 2019, provisional application No. 62/660,530, filed on Apr. 20, 2018.

(51) Int. Cl.
*H02J 7/00* (2006.01)
*H02J 7/02* (2016.01)
*H02J 7/35* (2006.01)
*H02M 7/483* (2007.01)
*H02M 7/797* (2006.01)
*H02M 1/00* (2006.01)

(52) U.S. Cl.
CPC ............ *H02J 7/35* (2013.01); *H02M 7/4837* (2021.05); *H02M 7/797* (2013.01); *B60L 2210/12* (2013.01); *B60L 2210/14* (2013.01); *B60L 2210/30* (2013.01); *H02J 2207/20* (2020.01); *H02J 2310/48* (2020.01); *H02M 1/0085* (2021.05); *H02M 7/483* (2013.01); *H02M 7/4833* (2021.05)

(58) Field of Classification Search
USPC ........................................................ 320/109
See application file for complete search history.

(56) References Cited

U.S. PATENT DOCUMENTS

| | | | |
|---|---|---|---|
| 4,528,492 A | 7/1985 | Inaniwa et al. | |
| 5,563,777 A | 10/1996 | Miki et al. | |
| 5,680,031 A | 10/1997 | Pavlovic et al. | |
| 5,684,379 A | 11/1997 | Svedoff | |
| 5,702,431 A | 12/1997 | Wang et al. | |
| 5,737,209 A | 4/1998 | Stevens | |
| 5,803,215 A | 9/1998 | Henze et al. | |
| 5,926,004 A | 7/1999 | Henze | |
| 6,130,522 A | 10/2000 | Makar | |
| 6,605,926 B2 | 8/2003 | Crisp et al. | |
| 6,804,127 B2 | 10/2004 | Zhou | |
| 7,256,516 B2 | 8/2007 | Buchanan et al. | |
| 7,301,308 B2 | 11/2007 | Aker et al. | |
| 7,550,872 B2 | 6/2009 | Hoekstra et al. | |
| 7,612,531 B2 | 11/2009 | Makhija et al. | |
| 8,143,843 B2 | 3/2012 | Ichikawa | |
| 8,149,017 B2 | 4/2012 | Knierim | |
| 8,299,754 B2 | 10/2012 | Hayashigawa et al. | |
| 8,332,078 B2 | 12/2012 | Narel et al. | |
| 8,374,729 B2 | 2/2013 | Chapel et al. | |
| 8,638,063 B2 | 1/2014 | Paryani et al. | |
| 8,716,978 B2 | 5/2014 | Kim | |
| 8,731,730 B2 | 5/2014 | Watkins et al. | |
| 8,744,641 B2 | 6/2014 | Ito | |
| 8,760,115 B2 | 6/2014 | Kinser et al. | |
| 8,798,803 B2 | 8/2014 | Bush et al. | |
| 8,829,859 B2 | 9/2014 | Chen | |
| 8,841,881 B2 | 9/2014 | Failing | |
| 8,847,555 B2 | 9/2014 | Loudot et al. | |
| 8,952,656 B2 | 2/2015 | Tse | |
| 8,983,875 B2 | 3/2015 | Shelton et al. | |
| 9,045,048 B2 | 6/2015 | Yukizane et al. | |
| 9,425,681 B2* | 8/2016 | Tengner ................... H02J 3/32 | |
| 9,481,257 B2 | 11/2016 | Lee et al. | |
| 2002/0113441 A1* | 8/2002 | Obayashi ............. H02J 7/1423 | |
| | | | 290/40 C |
| 2006/0022635 A1 | 2/2006 | Li et al. | |
| 2007/0145952 A1 | 6/2007 | Arcena | |
| 2008/0100259 A1* | 5/2008 | Tabatowski-Bush ................... | |
| | | | B60W 10/26 |
| | | | 320/104 |
| 2010/0141204 A1 | 6/2010 | Tyler et al. | |
| 2010/0181963 A1 | 7/2010 | Schreiber | |
| 2010/0244773 A1 | 9/2010 | Kajouke | |
| 2011/0133693 A1 | 6/2011 | Lowenthal et al. | |
| 2011/0175569 A1 | 7/2011 | Austin | |
| 2012/0323386 A1 | 12/2012 | To | |
| 2013/0103221 A1 | 4/2013 | Raman et al. | |
| 2013/0314038 A1 | 11/2013 | Kardolus et al. | |
| 2014/0021780 A1* | 1/2014 | Choi ................... B60L 53/64 | |
| | | | 320/109 |
| 2015/0137735 A1 | 5/2015 | Wacholtz, Jr. | |
| 2015/0016591 A1 | 6/2015 | Robers et al. | |
| 2015/0165917 A1 | 6/2015 | Robers et al. | |
| 2015/0171632 A1* | 6/2015 | Fry ..................... H02J 7/342 | |
| | | | 307/22 |
| 2015/0266389 A1 | 9/2015 | Appelbaum et al. | |
| 2016/0126862 A1* | 5/2016 | Vahedi .............. H02M 7/537 | |
| | | | 363/131 |
| 2016/0261178 A1* | 9/2016 | Sato ........................ H02M 1/12 | |
| 2016/0288664 A1* | 10/2016 | Biagini .................. B60L 53/14 | |
| 2018/0323621 A1* | 11/2018 | Fry ....................... H02J 7/0025 | |
| 2020/0403425 A1* | 12/2020 | Fry ....................... H02J 7/0044 | |
| 2021/0354578 A1* | 11/2021 | Kirschner .............. B60L 53/53 | |
| 2023/0039839 A1* | 2/2023 | Fry ............................ H02B 1/52 |

FOREIGN PATENT DOCUMENTS

| | | |
|---|---|---|
| CN | 102282749 A | 12/2011 |
| CN | 102859825 A | 1/2013 |
| CN | 103155405 A | 6/2013 |
| CN | 03601032 U | 5/2014 |
| CN | 103828187 A | 5/2014 |
| CN | 104242373 A | 12/2014 |
| CN | 105322624 A | 2/2016 |
| JP | 2009-011100 A | 1/2009 |
| JP | 2009-260760 A | 11/2009 |
| JP | 2012-034428 A | 2/2012 |
| JP | 2012-249505 A | 12/2012 |
| KR | 20120113084 A | 10/2012 |
| TW | 201711336 A | 3/2017 |
| WO | 2003/052916 A1 | 6/2003 |
| WO | 2011/134861 A1 | 11/2011 |
| WO | 2012/081330 A1 | 6/2012 |
| WO | 2012/098819 A1 | 7/2012 |
| WO | 2013/144947 A2 | 10/2013 |
| WO | 2012/081330 A | 5/2014 |

OTHER PUBLICATIONS

Vahedi Hani et al: "A new five-level buck-boost active rectifier", 2015 IEEE International Conference on Industrial Technology(ICIT), IEEE, pp. 2559-2564, dated Mar. 17, 2015.

Vahedi Hani et al: "PUC converter review: Topology, control and applications", IECON 2015—41st Annual Conference of the IEEE Industrial Electronics Society, IEEE, pp. 4334-4339, dated Nov. 9, 2015.

Vahedi Hani et al: "Sensor-less Five-level Packed U-Cekk(PUC5) Inverter Operating in Stand-Alone and Grid-Connected Modes", IEEE Transactions on Industrial Electronics, IEEE Service Center, vol. 12, No. 1, pp. 361-370, dated Feb. 1, 2016.

Vahedi Hani et al: "Real-Time Implementation of a Seven-Level Packed U-Cell Inverter with a Low-Switching-Frequency Voltage Regulator", IEEE Transactions on Power Electronics, Institute of Electrical and Electronics Engineers, USA, vol. 31, No. 8, pp. 5967-5973, dated Aug. 1, 2016.

Vahedi Hani et al: "Crossover Switches Cell (CSC): A new multi-level inverter topology with maximum voltage levels and minimum DC sources", IECON 2013—39th Annual Conference of the IEEE Industrial Electronics Society, IEEE, pp. 54-59, dated Nov. 10, 2013.

Metri Julie I et al : "Real-Time Implementation of Model Predictive Control on 7-Level Packed U-Cell Inverter", IEEE Transactions on Industrial Electronics, vol. 63 , No. 7 , pp. 4180-4186, dated Jul. 1, 2016.

(56) References Cited

OTHER PUBLICATIONS

Sharifzadeh Mohammad et al: "Optimised harmonic elimination modulation extended to four-leg neutral-point-clamped inverter", IET Power Electro, IET, UK, vol. 9, No. 3, pp. 441-448, dated Mar. 9, 2016.

Mozayan Seyed Mehdi et al: "Sliding mode control of PMSG wind turbine based on enhanced exponential reaching law", IEEE Transactions on Industrial Electronics, IEEE Service Center, vol. 63, No. 10, pp. 6148-6159, dated Oct. 1, 2016.

Vahedi Hani et al: "A new voltage balancing controller applied on 7-level PUC inverter", IECON 2014—40th Annual Conference of the IEEE Industrial Electronics Society, IEEE, pp. 5082-5087, dated Oct. 29, 2014.

Xue, Lingxiao, et al. ""Dual active bridge based battery charger for plug-in hybrid electric vehicle with charging current containing low frequency ripple."" Applied Power Electronics Conference and Exposition (APEC), 2013 Twenty-Eighth Annual IEEE. IEEE, 2013.http://oa.upm.es/29699/1/INVE_MEM_2013_169727.pdf.

Xue, Lingxiao, et al. "Closed-loop control on DC link voltage ripple of plug-in hybrid electric vehicle charger with sinusoidal charging." Energy Conversion Congress and Exposition (ECCE), 2013 IEEE. IEEE, 2013.

Xue, Lingxiao, et al. "Efficiency optimized AC charging waveform for GaN bidirectional PHEV Battery Charger." Power Electronics and Applications (EPE'14—ECCE Europe), 2014 16th European Conference on. IEEE, 2014.

Hu, Sideng, et al. "Hybrid sinusoidal-pulse charging strategy for Li-ion battery in electric vehicle application." Applied Power Electronics Conference and Exposition (APEC), 2015 IEEE. IEEE, 2015.

Chen, Liang-Rui, et al. "Design of sinusoidal current charger with optimal frequency tracker for Li-ion battery." Power Electronics Conference (IPEC), 2010 International. IEEE, 2010.http://120.107.180.177/1832/9901/099-1-17p.pdf.

"Effects of AC Ripple Current on VRLA Battery Life", http://www.emersonnetworkpower.com/documentation/en-us/brands/liebert/documents/white%20papers/effects%20of%20ac%20ripple%20current%20on%20vrla%20battery%20life.pdf.

"Charger Output AC Ripple Voltage and the affect on VRLA batteries", https://www.cdtechno.com/pdf/ref/41_2131_0212.pdf.

International application No. PCT/CA2017/051218 International Preliminary Report on Patentability Chapter I dated Apr. 14, 2020.

International application No. PCT/CA2017/051218 International Search Report dated Jul. 13, 2018.

International application No. PCT/CA2017/051218 Written Opinion of the International Searching Authority dated Jul. 13, 2018.

International application No. PCT/CA2018/051291 International Preliminary Report on Patentability Chapter I dated Apr. 14, 2020.

International application No. PCT/CA2018/051291 Supplementary International Search Report dated May 13, 2019.

International application No. PCT/CA2018/051291 International Search Report dated Feb. 4, 2019.

International application No. PCT/CA2018/051291 Written Opinion of the International Searching Authority dated Feb. 4, 2019.

Related Indian patent application No. 202037018839 Office Action dated Feb. 23, 2022. Translation provided.

Related Korean patent application No. KR 10-2020-7013723 Notification of reason for refusal dated Jul. 7, 2021. Translation provided.

Related Korean patent application No. KR 10-2020-7013723 Notification of final rejection dated Apr. 18, 2022. Translation provided.

Corresponding Korean Patent Application No. 10-2022-7030829 examination report dated May 19, 2023.

Corresponding European patent application No. 22159044.1 search report dated May 17, 2022.

Corresponding Japanese Patent Application No. 2020-520042 examination report dated Sep. 27, 2022 (Translation provided).

Corresponding Taiwan Patent Application No. 107140821 examination report dated Sep. 23, 2022 (Comments provided in English).

Corresponding Brazilian Patent Application No. BR112020007129-3 English translation of preliminary office action report dated Oct. 25, 2022.

Corresponding Japanese Patent Application No. 2020-520042 examination report dated Aug. 19, 2022.

Corresponding Korean Patent Application No. 10-2020-7013723 written opinion dated May 19, 2022.

Corresponding Korean Patent Application No. 10-2020-7013723 written opinion dated Jun. 16, 2022.

Corresponding Australian Patent Application No. 2018349094 examination report dated Mar. 30, 2023.

Corresponding Chinese Patent Application No. 201880066658.9 examination report dated Mar. 31, 2023.

Corresponding Israel Patent Application No. 273921 examination report dated Nov. 30, 2022.

Corresponding Japanese Patent Application No. 2020-520042 examination report dated Jul. 4, 2023.(translation provided).

\* cited by examiner

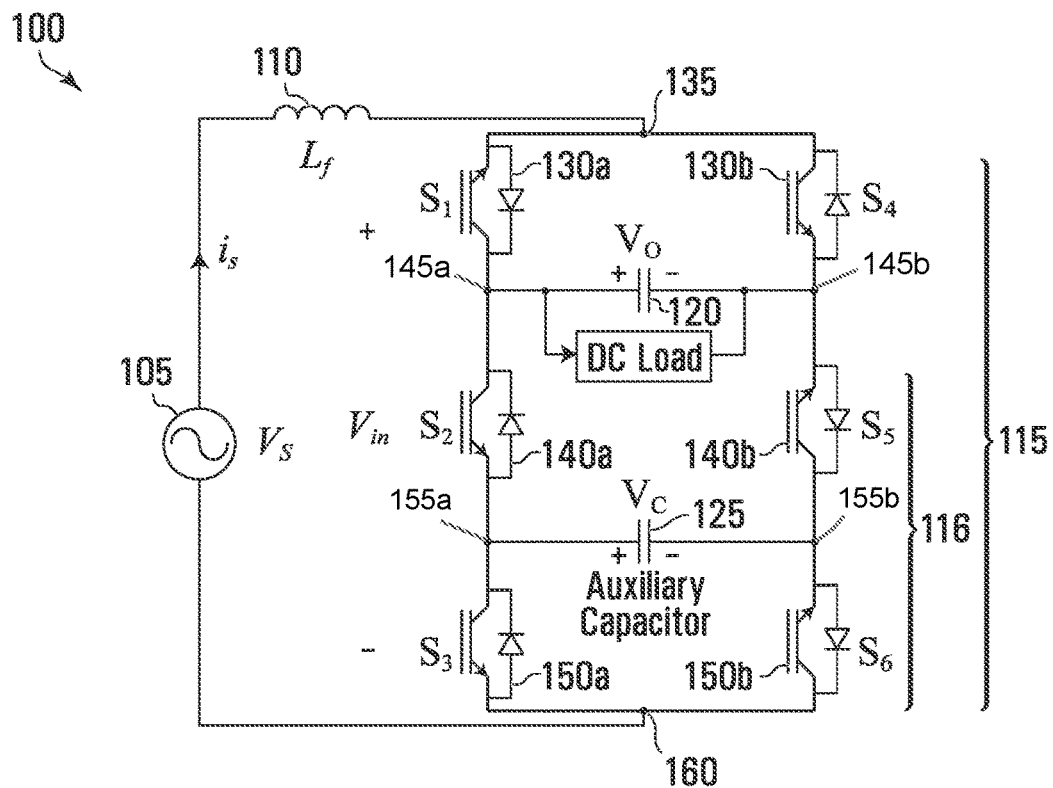
FIG. 2A
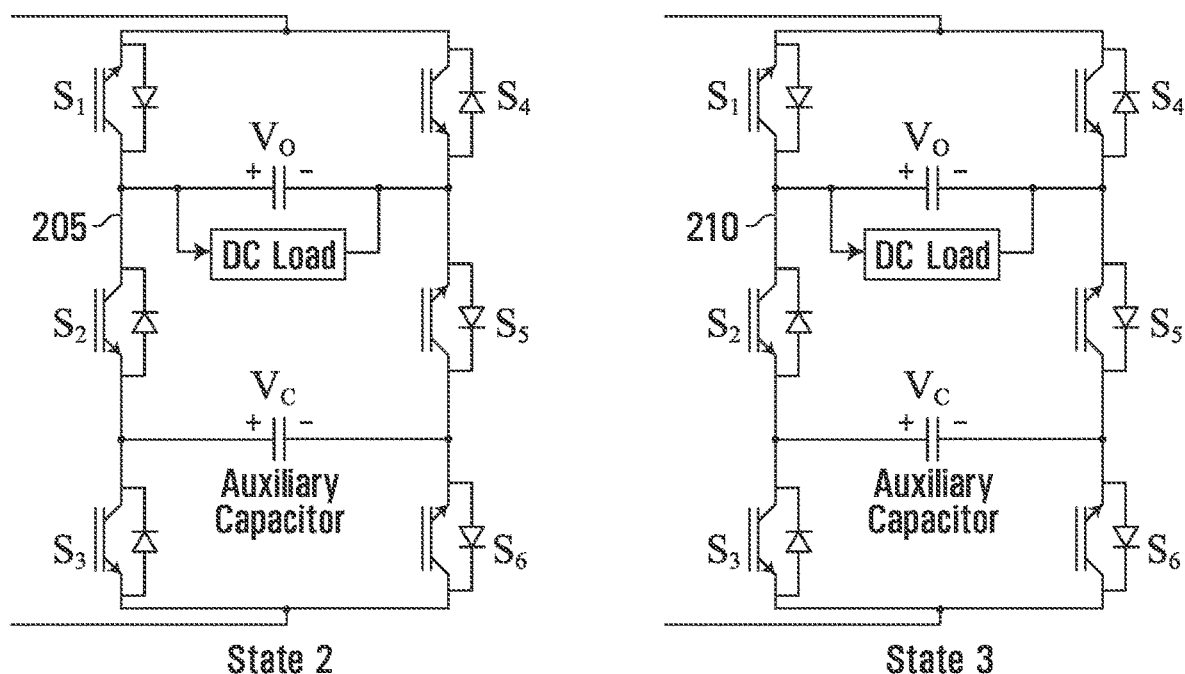
FIG. 2B  FIG. 2C

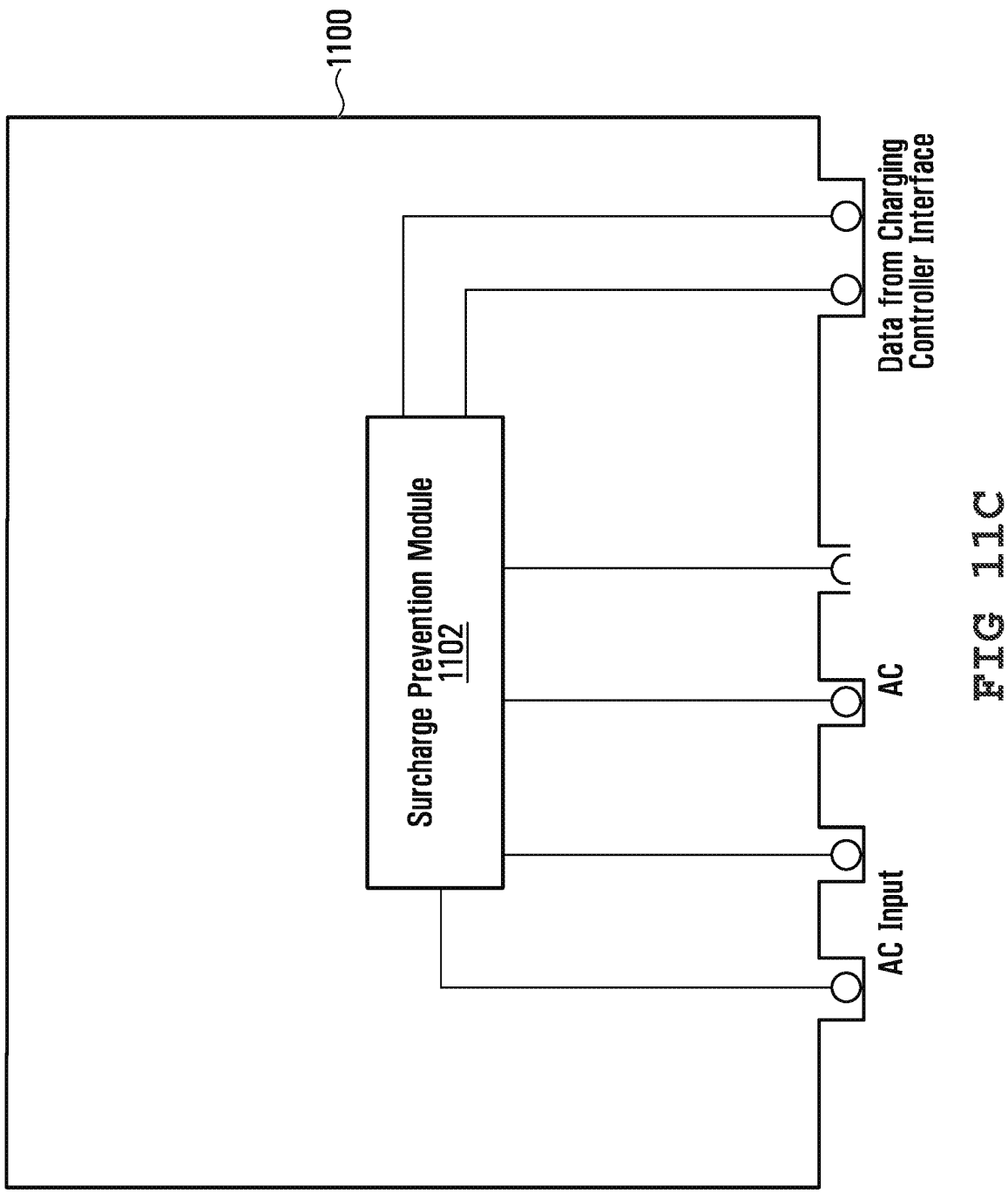

ELECTRIC VEHICLE BATTERY CHARGER

CROSS-REFERENCE TO RELATED APPLICATIONS

This application is a continuation of Ser. No. 16/901,445 filed Jun. 15, 2020, now allowed, which is a continuation of Ser. No. 16/677,147 filed Nov. 7, 2019, now U.S. Pat. No. 10,759,287 issued Sep. 1, 2020, which claims priority of U.S. provisional patent application Ser. No. 62/817,104, filed Mar. 12, 2019 and is a continuation-in-part of POT application PCT/CA20181051291 filed on Oct. 12, 2018 designating the US that claims priority of PCT/CA2017/051218 filed Oct. 13, 2017 and of U.S. provisional patent application 62/660,530 filed on Apr. 20, 2018, the specifications of which are hereby incorporated by reference.

TECHNICAL FIELD

The present relates to the field of battery charging systems such as used in, e.g., electric vehicles. The present also relates to the field of power converters such as rectifiers operating at residential voltage and power.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Currently, an electric vehicle (EV) typically comprises a battery bank and battery charging system. The battery bank typically requires direct current (DC) input to charge the batteries. To that end, an onboard charging circuit is provided that converts AC power typically found in the home to a DC input for the battery bank. In what is typically known as "level 1" and "level 2" charging, the battery charging system is provided with household or similar alternating current power, which it converts to DC in order to feed the battery bank. Level 1 and level 2 charging mainly differ by the amount of power supplied and sometimes by the voltage as well.

"Level 3" charging generally refers to DC charging, which can involve DC current at high power, e.g., voltages above 350V and high currents leading to charging powers that are typically above 15 kW and run up to 160 kW. Level 3 charging stations are commercial charging stations that seek to charge EVs as quickly as possible. With current EV batteries, very rapid charging can be achieved up to about 75% to 80% of the battery's charge capacity. With some EV batteries, charging from 15% to 80% of battery capacity can be done within 15 to 20 minutes of high power charging. After this point, charging is very slow, for example, it can take a number of hours to raise the charge level from 80% to 99%. Normally the customer will be encouraged to leave the charging station so that other customers can charge their vehicles. Such rapid charging is convenient for commercial charging station operations; however, it can shorten the lifespan of some EV batteries to be subjected to such high power charging. For example, it might be preferable in terms of battery lifespan to allow for 2 hours to charge a battery from 15% to 80% of capacity instead of 20 minutes.

The DC power for such charging is supplied from three-phase power mains that are normally made available to commercial installations and not residences. Three-phase AC electrical power can be efficiently converted to DC. Typically, this kind of charging is unavailable in residences where available power is also typically limited to below 60 kW. In certain places, for example, power supply to the residential panel may be capped at 200 A at 240V (RMS), giving a total available power, for all household use, of 48 kW. By providing such a power limit using a main circuit breaker, the local distribution transformer, which is often sized using "oversubscription" assumptions, is statistically protected against overload as a result of too many residences drawing too much power. Moreover, level 3 charging, when starting from an AC current source requires a rectifier circuit, which is typically not provided in the home because of cost issues among other reasons.

Current residential car charging systems behave essentially like a high-power appliance, drawing from, e.g., a clothes dryer pug. In level 2 charging, the power is typically limited to about 7 kW or less that is a load comparable to a clothes dryer (30 amps at 240 V is 7.2 kW). The charging unit installed in the home connects the main AC power to the vehicle through a breaker circuit so that the vehicle's on-board AC to DC conversion circuitry can charge the vehicle battery.

Most electric vehicles allow for "fast" DC charging in which case the AC to DC converter is external to the EV. An advantage of DC charging is not only that the charge power can be greater than the capacity of the AC to DC converter in the vehicle, but also that the efficiency of the conversion is not dependent of the converter provided by the manufacturer at the time of making the vehicle. If DC charging can be made efficiently available to residences, then heavy and expensive level 2 charging equipment onboard vehicles could be omitted.

With level 2 power consumption, the probability that vehicle's charging will cause the residential electrical entry or main circuit panel to draw more than its allowed power budget (and thus cause the main breaker to trip with the result that the panel is disconnected from the distribution transformer) is quite low. However, when a load greater than 7 kW is added to most domestic electrical panels, and for a duration of a number of hours, the risk increases that the total power budget of the domestic electric panel will be exceeded.

SUMMARY

This patent application provides complementary improvements that may be applied separately or in combination. The first improvement relates to an improved rectifier used in DC charging. In one aspect, the improved rectifier has a high-voltage capacitor module that is easily replaced within the charger. In another aspect, the charger comprises a backplane and blade architecture that allows the AC to DC conversion to be distributed over a number of lower power blade modules so as to use blade modules providing each less than about 5 kVA so that the combination of blade modules can provide power conversion of over 10 kVA (and preferably over 20 kVA) of AC power into DC charging power output. The second improvement relates to a battery charging system that allows a power level to be used for battery charging that would exceed the nominal budget of the electrical entry if all non-charging loads were connected to the entry drawing their loads at the same time. Therefore, according to the second improvement, a time-based prediction of non-charging load power consumption is made based on modelling and/or historical monitoring of non-charging load power consumption. A third improvement relates to a power converter having a charging power program module with a user input interface for receiving user input defining charging aggressivity parameters, wherein the charging power program module controls a current level over time in response to the charging aggressivity parameters. A fourth improvement relates to a socket-type connector for removing and replacing a high-voltage capacitor from a power converter. A fifth improvement relates to a power converter having a circuit capable of operating in bidirectional states meaning, in addition to providing DC charging capabilities with an AC input as a rectifier, it is able to convert voltage/current from DC to AC as an inverter, hence, providing an AC output from a DC battery of an electrical vehicle.

In some embodiments, a battery charger converts AC power and delivers DC power to an electric power storage battery. An AC input receives power from an electrical entry, a power converter connects to the AC input and responds to a charge voltage value and a desired charge current value to convert power to a variable DC voltage at a variable current not exceeding a desired charge current value for a DC load. The power converter has at least one high-voltage capacitor for storing power at a voltage boosted above a peak voltage of the AC input.

In some embodiments, the charger circuit can operate in bidirectional states meaning, it is able to convert voltage/current from AC to DC as a rectifier or from DC to AC as an inverter, hence, providing an AC output from a DC battery of an electrical vehicle.

In an aspect of the present disclosure, the charger circuit can work only as a rectifier in a unidirectional way to convert AC voltage to DC as a unidirectional charger by replacing the two high-voltage switches connected between the first terminal and respective opposed ends of the high-voltage capacitor in the charger circuit with two diodes.

Herein, the battery charger converter working in the rectifier or inverter mode can be referred to respectively as the battery charger rectifier or battery charger inverter.

In some embodiments, the battery charger disclosed herein has a housing with an AC input for receiving power from an electrical entry, an AC output, and a DC output wherein a switch connects the AC input to the AC output. The switch may also connect to a backplane which has one or more module connector adapted for receiving one or more DC power converter module. In the AC mode, the switch is closed and connects the AC input to the AC output providing the electric power storage battery with an AC current. In the DC mode, the switch is open connecting the AC input to the DC power converter modules providing a DC current to the DC output.

In one embodiment, the charger has module connectors adapted for receiving one or more DC power converter modules but does not have the DC power converter modules originally installed within the housing providing the user with a level 2 AC EV battery charger. The DC power converter modules can be added at a later time to the charger to upgrade it to a level 3 DC EV charger.

In another aspect, the present invention provides a portable DC charging unit for use for electrical vehicles. The DC portable unit comprising of a housing having a connector backplane having a number of sockets for receiving at least one module comprising a battery rectifier circuit, an AC input for receive AC current from an AC source, and a DC output that connects to the electrical vehicle through a DC cable.

In another broad aspect, the present disclosure provides a power converter connected to an AC input converting power from the AC input to DC comprising at least one high-voltage capacitor for storing power at a voltage boosted above a peak voltage of the AC input, a rectifier circuit. The rectifier comprises an inductor connected in series with the AC input, a low-voltage capacitor, and either two diodes connected between or alternatively two high-voltage switches connected between a first AC input terminal and opposed ends of the high-voltage capacitor, two intermediate low-voltage power switches connected between the opposed end of the high-voltage capacitor and the opposed ends of the low-voltage capacitor, and two terminal low-voltage power switches connected between the opposed ends of the low-voltage capacitor and a second AC terminal, wherein a DC load can be connected to the opposed ends of the high-voltage capacitor. The power converter further comprises a controller having at least one sensor for sensing current and/or voltage in the rectifier circuit and connected to a gate input of the two intermediate low-voltage power switches and the two terminal low-voltage power switches.

In some embodiments, the controller may be operative for causing the rectifier circuit to operate in a boost mode wherein a voltage of the high-voltage capacitor is higher than a peak voltage of the AC input, and the two intermediate low-voltage power switches and the two terminal low-voltage power switches are switched with redundant switching states in response to a measurement of a voltage present at the low-voltage capacitor so as to maintain the low-voltage capacitor at a predetermined fraction of a desired voltage for the high-voltage capacitor and to thus maintain the high-voltage capacitor at a desired high voltage, with the rectifier circuit supplying, the DC load and absorbing power as a five-level active rectifier with low harmonics on the AC input.

In some embodiments, the power converter instead of a rectifier circuit has a bidirectional rectifier/inverter circuit and two controllers instead of one to be able to work bidirectionally as a rectifier and inverter. The bidirectional rectifier/inverter circuit comprises an inductor connected in series with an AC port, a low-voltage capacitor, two high-voltage power switches connected between a first AC terminal and opposed ends of the high-voltage capacitor, two intermediate low-voltage power switches connected between the opposed end of the high-voltage capacitor and the opposed ends of the low-voltage capacitor, and two terminal low-voltage power switches connected between the opposed ends of the low-voltage capacitor and a second AC terminal, wherein a DC port can be connected to the opposed ends of the high-voltage capacitor. The power convertor further comprises a first controller for a rectifier mode having at least one sensor for sensing current and/or voltage in the bidirectional rectifier/inverter and connected to a gate input of the two high-voltage power switches, the two intermediate low-voltage power switches and the two terminal low-voltage power switches for causing the rectifier circuit to operate in a boost mode wherein a voltage of the high-voltage capacitor is higher than a peak voltage of the AC input, and the two high-voltage power switches are controlled to switch on and off at a frequency of the AC input, and the two intermediate low-voltage power switches and the two terminal low-voltage power switches are switched with redundant switching states in response to a measurement of a voltage present at the low-voltage capacitor so as to maintain the low voltage capacitor at a predetermined fraction of a desired voltage for the high-voltage capacitor and to thus maintain the high voltage capacitor at a desired high voltage, with the rectifier circuit supplying the DC load and absorbing power as a five-level active rectifier with low harmonics on the AC input. The power converter also has a second controller for an inverter mode connected to the two high-voltage power switches, the two intermediate low-voltage power switches and the two terminal low-voltage power switches and configured to generate and apply to the two high-voltage power switches, the two intermediate low-voltage power switches and the two terminal low-voltage power switches signal waveforms comprising a first control signal for causing the low-voltage capacitor to be series connected with the DC port and the AC port and charged to a predetermined value proportional to a Voltage of the DC port, and a second control signal for causing the low-voltage capacitor to be disconnected from the DC port and series connected with the AC port, thereby causing the low-voltage capacitor to be discharged.

In one aspect, the present disclosure provides a battery charger for converting AC power and for delivering DC power to an electric power storage battery. The charger comprises an AC input for receiving power from an electrical entry, a battery charging controller interface for communicating with the electric power storage battery and receiving a charge voltage value and a desired charge current value, a power converter connected to the AC input and responsive to the charge voltage value and the desired charge current value to convert power from the AC input to DC at a DC output at a variable voltage according to the charge voltage value and at a variable current not exceeding the desired charge current value for a DC load, the power converter comprising at least one high-voltage capacitor for storing power at a voltage boosted above a peak voltage of the AC input. The charger may further be characterized by one of the following:

In some embodiments the power converter comprises an electrical entry power sensor for measuring power drawn by the electrical entry from its distribution transformer and a power drawn increase prediction module having an input for receiving a value of the power drawn and an output providing a value of a greatest probable jump in power drawn at the electrical entry, the power converter being configured to restrict the current level output by the power converter so as to prevent power drawn by the electrical entry from exceeding a predefined limit should the greatest probable jump in power drawn occurs.

In some embodiments, the power converter comprises a charging power program module having a user input interface for receiving user input defining charging aggressivity parameters, wherein the charging power program module controls the current level over time in response to the charging aggressivity parameters.

In some embodiment, the charger further comprises a socket-type connector for removing and replacing the high-voltage capacitor from the power converter.

In some embodiments, the power converter or a charger comprises a rectifier circuit comprising an inductor connected in series with the AC input, a low-voltage capacitor, two high-voltage power switches connected between a first AC input terminal and opposed ends of the high-voltage capacitor, two intermediate low-voltage power switches connected between the opposed end of the high-voltage capacitor and the opposed ends of the low-voltage capacitor, and two terminal low-voltage power switches connected between the opposed ends of the low-voltage capacitor and a second AC terminal, wherein a DC load can be connected to the opposed ends of the high-voltage capacitor. The converter also has a modulator receiving a reference signal from a controller and working with a state selection module enforcing a predefine switching technique to provide state selection signals indicative of respective states of said two high-voltage, said intermediate low-voltage, and said two terminal low-voltage power switches pulse generator.

In some embodiments, the convertor or the charger may have at least one sensor connected to said modulator for sensing current and/or voltage in said rectifier circuit and connected to a gate input of said two intermediate low-voltage power switches and said two terminal low-voltage power switches.

In some embodiments, the convertor or the charger the state selection module uses voltage between said the high-voltage capacitor and said the low-voltage capacitor to provide said state selection signals.

In some embodiments, the controller may communicate with said at least one sensor for sensing current and/or voltage in the rectifier circuit which is connected to a gate input of the two high-voltage power switches, the two intermediate low-voltage power switches and the two terminal low-voltage power switches for causing the rectifier circuit to operate in a boost mode wherein a voltage of the high-voltage capacitor may be higher than a peak voltage of the AC input, and the two high-voltage power switches are controlled to switch on and off at a frequency of the AC input, and the two intermediate low-voltage power switches and the two terminal low-voltage power switches are switched with redundant switching states in response to a measurement of a voltage present at the low voltage capacitor so as to maintain the low voltage capacitor at a predetermined fraction of a desired voltage for the high-voltage capacitor and to thus maintain the high voltage capacitor at a desired high voltage, with the rectifier circuit supplying the DC load and absorbing power as a five-level active rectifier with low harmonics on the AC input, and a buck converter circuit for down converting DC power from the opposed ends of the high voltage capacitor to a lower DC output voltage set by the charge voltage value.

In some embodiments, the charger can be characterized by a power converter which comprises both of the following:

an electrical entry power sensor for measuring power drawn by the electrical entry from its distribution transformer and a power drawn increase prediction module having an input for receiving a value of the power drawn and an output providing a value of a greatest probable jump in power drawn at the electrical entry, the power converter being configured to restrict the current level output by the power converter so as to prevent power drawn by the electrical entry from exceeding a predefined limit should the greatest probable jump in power drawn occur; and a rectifier circuit comprising an inductor connected in series with the AC input, a low-voltage capacitor, two high-voltage power switches connected between a first AC input terminal and opposed ends of the high-voltage capacitor, two intermediate low-voltage power switches connected between the opposed end of the high-voltage capacitor and opposed ends of the low-voltage capacitor, and two terminal low-voltage power switches connected between the opposed ends of the low-voltage capacitor and a second AC terminal, wherein a DC load can be connected to the opposed ends of the high-voltage capacitor; a controller having at least one sensor for sensing current and/or voltage in the rectifier circuit and connected to a gate input of the two high-voltage power switches, the two intermediate low-voltage power switches and the two terminal low-voltage power switches for causing the rectifier circuit to operate in a boost mode wherein a voltage of the high-voltage capacitor can be higher than a peak voltage of the AC input, and the two high-voltage power switches are controlled to switch on and off at a frequency of the AC input, and the two intermediate low-voltage power switches and the two terminal low-voltage power switches are switched with redundant switching states in response to a measurement of a voltage present at the low-voltage capacitor so as to maintain the low voltage capacitor at a predetermined fraction of a desired voltage for the high-voltage capacitor and to thus maintain the high voltage capacitor at a desired high voltage, with the rectifier circuit supplying the DC load and absorbing power as a five-level active rectifier with low harmonics on the AC input; and a buck converter circuit for down converting DC power from the opposed ends of the high-voltage capacitor to a lower DC output voltage set by the charge voltage value.

In some embodiments, the charger also has a network interface for receiving user input comprising a remote device user interface connected to the network interface.

In one embodiment, the power converter comprises the charging power program module, and the charging aggressivity parameters define an upper charging current limit for charging the vehicle. In one example, the charging power program module records a history of charging current so that an assessment of battery degradation can be performed.

In some embodiments, the charger may be characterized by the power converter comprising an electrical entry power sensor for measuring power drawn by the electrical entry from its distribution transformer and a power drawn increase prediction module having an input for receiving a value of the power drawn and an output providing a value of a greatest probable jump in power drawn at the electrical entry, the power converter being configured to restrict the current level output by the power converter so as to prevent power drawn by the electrical entry from exceeding a predefined limit should the greatest probable jump in power drawn occur, further comprising a sheddable load switch; wherein the power drawn increase prediction module is connected to the sheddable load switch for temporarily disconnecting at least one shiftable load connectable to the sheddable load switch when the greatest near-term probable jump in power drawn poses a risk of exceeding the predefined limit, the power drawn increase prediction module is configured to re-connect the shiftable load when the power drawn increase predictor module determines that the near-term risk of exceeding the predefined limit has subsided.

Provided are systems, methods and more broadly technology as described herein and claimed below.

BRIEF DESCRIPTION OF THE DRAWINGS

The present examples will be better understood with reference to the appended illustrations which are as follows:

FIG. 2A shows a circuit diagram of a battery apparatus converter with a 5-level topology circuit working in a rectifier mode, according to a particular example of implementation;

FIG. 2B shows a circuit diagram of a 5-level topology circuit of the battery apparatus of FIG. 2A showing connectivity under one switching configuration called "State 2";

FIG. 2C shows a circuit diagram of a 5-level topology circuit of the battery apparatus of FIG. 2A showing connectivity under one switching configuration called "State 3";

FIG. 11C illustrates a schematic diagram of an AC charging blade 1100 with a surcharge prevention module in accordance with one embodiment;

DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

Throughout this application, the term "EV Level 2 charger" refers to a single phase AC EV charger and the term "EV Level 3 charger" refers to a single phase DC EV charger.

Figure 1A:
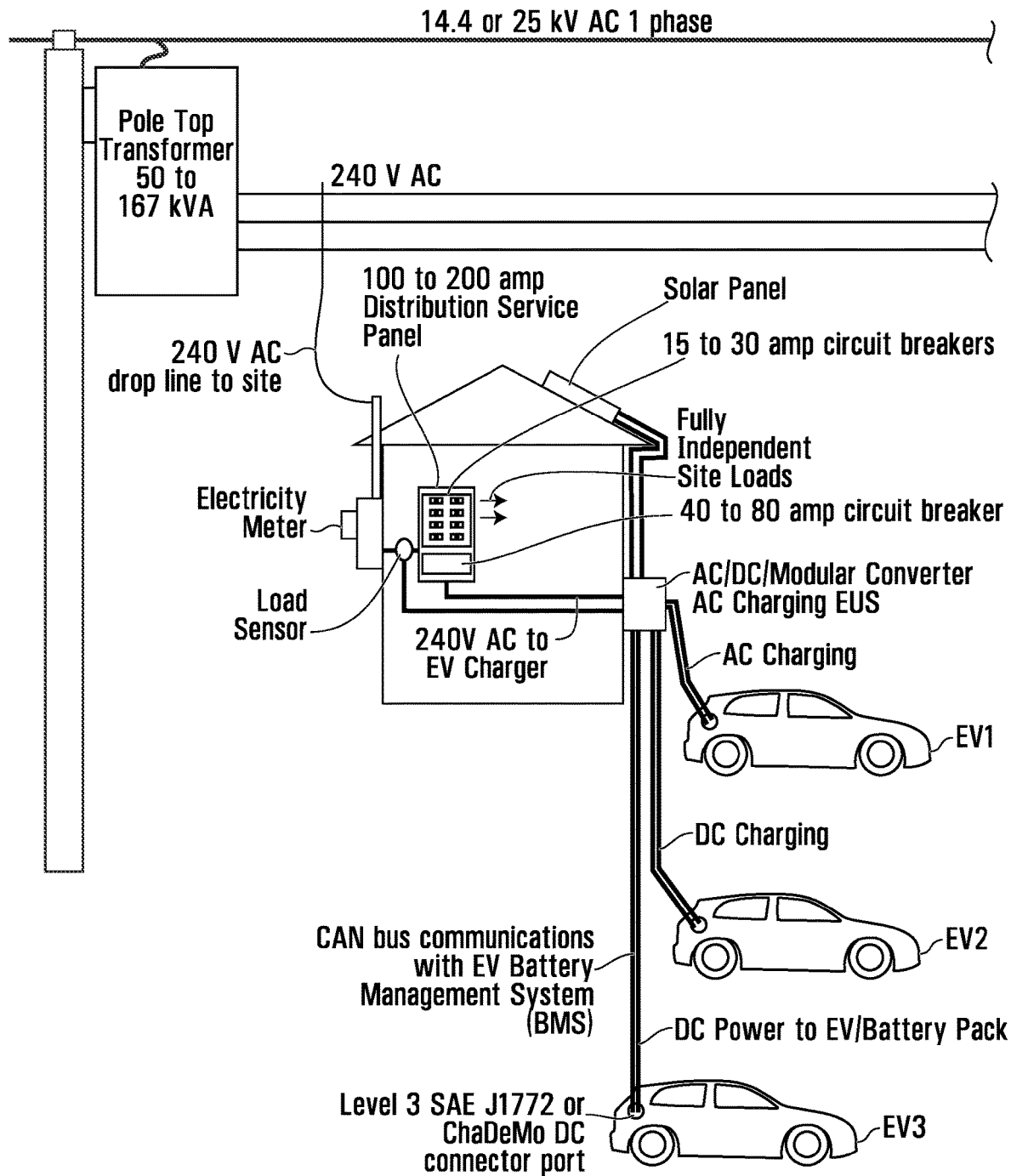
FIG. 1A is a schematic illustration of the physical installation of a home EV charging system including a pole-top transformer, residential electrical entry with a load sensor and a main circuit breaker panel, a 240V AC power line between the panel and an apparatus, two cable connection extending between the apparatus and an electric vehicle (EV) with CAN bus communication connection between the EV and the apparatus and a solar panel connection.

FIG. 1A illustrates the physical context of an embodiment in which split single phase mains power is delivered from a utility pole top transformer, as is the most common type of electrical power delivery in North America. The transformer receives typically 14.4 kV or 25 kV single-phase power from a distribution line and the transformer can handle approximately 50 kVA to 167 kVA of power delivered as split phase 240 VAC to a small number of homes or electrical entries. Each electrical entry is typically configured to handle between 100 A to 200 A of power at 240 VAC, namely about 24 kVA to 48 kVA (the common assumption is that 1 kVA is equivalent to 1 kW).

Figure 1B:
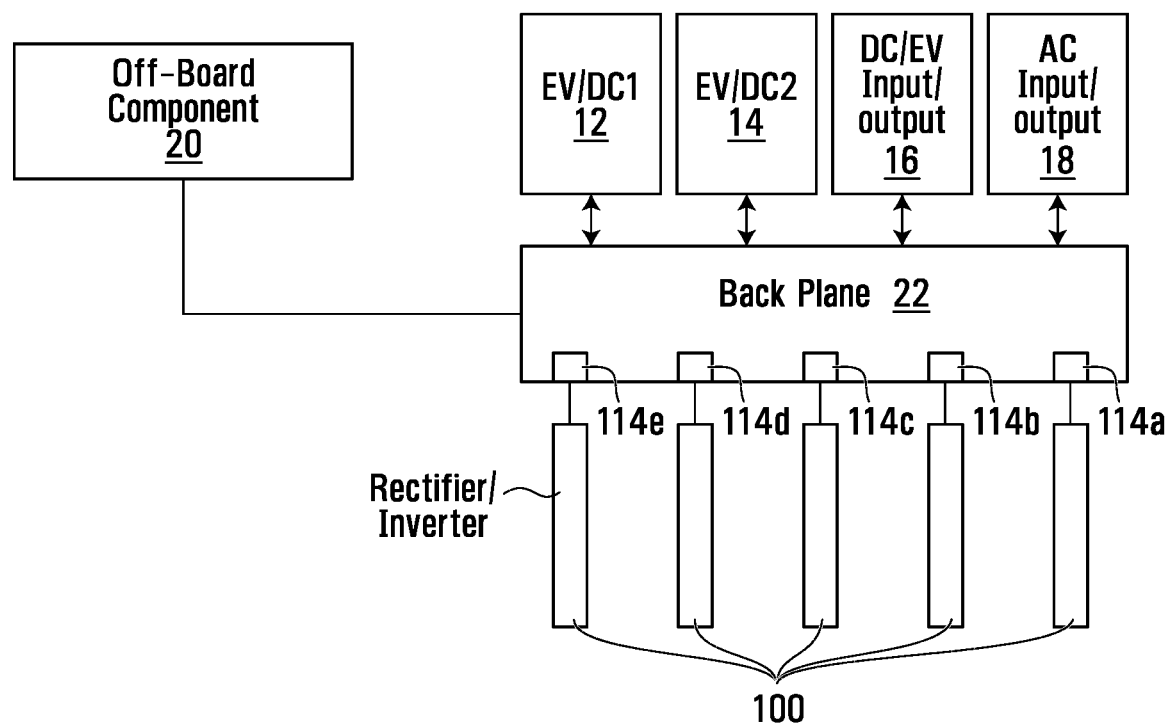
FIG. 1B is a block diagram showing a power conversion and EV charger with multiple DC ports and off-board component panel.

FIG. 1B is a block diagram showing a power conversion apparatus with an AC port 18, multiple DC ports, an EV/DC ports 12 and 14, DC/EV input port 16 and off-board component panel 20. In one embodiment, as illustrated in FIG. 1A, the ports 12 and 14 may connect to EV1 and EV2 and DC/EV port 16 may connect to solar panels to use the DC energy produced by the panels.

It will be appreciated by those skilled in the art that while the circuit works with single-phase current, the AC input may also receive split single phase, or line (phase to phase) or phase (phase to neutral) voltage which may come from a 3-phase 3-wire or 4-wire electric entry.

It will be appreciated by those skilled in the art that embodiments are not restricted to split single phase 240 VAC power systems, and that the embodiments disclosed herein can be adapted to the power networks in use that are of any existing AC voltage and phases delivered to the electrical entry of homes or businesses.

The electrical entry typically comprises a usage meter, a main breaker having a rating corresponding to the total permitted load (e.g. 100 A, 200 A), and a panel having circuit breakers for each household circuit which may be supplied with 240 VAC power or 120 VAC power from the split phase 240 VAC input. While most circuit breakers have capacities of between 15 A to 30 A, some can be lower (namely 10 A) and some may be larger, such as 40 A, for large appliances. In some countries, electrical entries have a lower capacity, such as 40 A to 60 A, and in countries with 240 VAC in all household circuits, the power is not split phase, but regular single phase 240 VAC (the voltage level used can vary from about 100 V to 250 V).

As illustrated in FIG. 1A, the charger is connected to a circuit breaker of the main panel through a breaker having a larger current rating, such as 40 A to 80 A, although the charger disclosed can consume over 100 A if desired. The need for a circuit breaker specific to the charger is determined by electrical codes. The cable connecting the charger to the panel is rated for such high current. The connection to the electrical panel can be a direct fixed wiring, or a high-voltage socket can be installed and connected to the electrical panel such that the charger connects to the panel using a cable and plug, for example, those that are similar to those used for appliances like ovens or clothes dryers. The charger is shown to be connected to a single load sensor that senses the load drawn by the whole panel including the charger. The charger cable can be a conventional charger cable and plug, as is known in the art.

FIG. 2A shows a battery charger converter 100 for an electric vehicle according to a particular example of implementation. The circuit features a 5-level Packed U-Cell topology providing an active rectifier with power factor correction. The charger has several noteworthy advantages over other types of converter and features a boost mode operation which allows supra-AC peak output while reducing or eliminating input side current harmonics.

The battery charger converter 100 comprises an AC input 105, an inductive filter 110 connected in series with the AC input 105, and a 5-level topology circuit 115.

The inductive filter 110 in this non-limiting example is a 2.5 mH inductor. For a typical 1 to 3 kW range of power to be delivered (during all charging states of full power to under-power), a 1 mH line inductor provided good results which complied with existing standards. For higher power ranges, the inductance may be reduced; for example, for a high wattage (e.g. greater than 2 kW, and preferably greater than 3 kW, and more preferably approximately 5 kW) power rating, the inductive filter 110 may instead use a 500 pH inductor. Conveniently the present design allows for a small geometry of the overall battery charger converter 100, due in part to the small size of the inductive filter 110. The inductive filter 110 can vary according to design as chosen based on the application, power rating, utility voltage harmonics, switching frequency, etc. Although the simplest such filter is a single inductor, in alternative embodiment the inductive filter 110 may include a combination of inductor(s) and capacitor(s), e.g., an (e.g., 2 mH) inductor connected to a (e.g., 30 µF) capacitor, itself connected to ground. The choice of the filter has an impact on the overall size of the design and losses, with a bigger filter increasing the size of the overall design and generally incurring more losses.

The 5-level circuit comprises a high-voltage capacitor 120, at least one low-voltage capacitor 125, two high-voltage power switches 130a, 130b connected between a first terminal 135 and respective opposed ends 145a, 145b of the high-voltage capacitor 120, two intermediate low-voltage power switches 140a, 140b, each connected between respective ones of the two opposed ends 145a, 145b of the high-voltage capacitor 120 and respective opposed ends 155a, 155b of the low-voltage capacitor 125, and two terminal low-voltage power switches 150a, 150b each connected between a second input terminal 160 and respective ones of the opposed ends 155a, 155b of the low-voltage capacitor 125.

The capacitors are so named because the high-voltage capacitor 120 may have, in use, a higher voltage across it than there is across the low-voltage capacitor 125. In this particular example, the voltage $V_o$ across the high-voltage capacitor 120 may be approximately twice the voltage $V_c$ across the low-voltage capacitor 125. In the present example, the high-voltage capacitor 120 and the low-voltage capacitor 125 may be different devices, the high-voltage capacitor 120 being a 2 mF capacitor and the low-voltage capacitor being a 50 µF capacitor. For a typical 1 to 3 kW range of power to be delivered (during all charging states of full power to under-power), a combination of a 2 mF capacitor for the high-voltage capacitor 120 and a 100 µF capacitor for the low-voltage capacitor 125 may provide good results which complied with existing standards. In one example, this has been found to work when using a 20 µs sampling time for the voltage balancing. For a 5 kW power device, a combination of a 4 mF capacitor for the high-voltage capacitor 120 and a 200 µF capacitor for the low-voltage capacitor 125 may be suitable, however it may be possible to use smaller capacitors by increasing the speed of sampling done for voltage balancing and so achieve more precise calculations for voltage balancing. This may be achieved by using a faster microprocessor. Each of the capacitors may be electrolytic or film capacitors but in the present example, the low-voltage capacitor 125, which is not connected to the load, is a high lifetime film capacitor.

In some embodiments, the high-voltage capacitor 120 may have a shorter lifetime and will likely be the cause of failure in the circuit; therefore, the high-voltage capacitor maybe provided as a replaceable component.

Naturally, it may be more economical to use capacitors having characteristics not exceeding their requirements, however nothing prevents the use of identical capacitors for both the high-voltage capacitor 120 and the low-voltage capacitor 125, although in such a case the low-voltage capacitor 125 would be over-specified.

The intermediate low-voltage power switches 140a, 140b and the terminal low-voltage power switches 150a, 150b together may be referred to as the auxiliary power switches. As with the capacitors, the high-voltage power switches 130a, 130b and the low-voltage power switches may be called so because high-voltage power switches 130a, 130b may have, in use, a higher voltage across them than the auxiliary power switches.

Moreover, according to some embodiments of the present design, the low-voltage power switches may be high-frequency power switches while the high-voltage power switches 130a, 130b may be low-frequency switches. Again, they are so called because, in use, the high-frequency switches may operate at a higher frequency than the low-frequency switches. In fact, identical switches may be used throughout provided that they are suitable for the highest frequency applied to the high-frequency switches and that they are suitable for the high voltage applied across the high-voltage switches. However, it may be preferable to provide switches that are suited only for their intended use so as to reduce costs, as well as, potentially, size and weight. The switches may all be of the FET, JFET, IGBT, MOSFET, GAN or any type of controllable switches.

The low-voltage capacitor 125 of the 5-level circuit 115 may be considered an auxiliary capacitor which, together with the auxiliary power switches makes up the auxiliary circuitry 116 of the 5-level circuit 115. As described herein, additional auxiliary capacitor(s) and pair(s) of switches may be provided in the auxiliary circuitry 116 in alternative embodiments.

The 5-level circuit 115 switching states have been investigated to reveal the redundant ones so as to help balancing the auxiliary capacitor voltage. The capacitor voltage balancing allows producing 5 voltage levels at the rectifier input and reducing the voltage harmonics that affects the current harmonic contents directly. The output terminal voltage is regulated to supply DC loads. Herein, experimental results are provided demonstrating dynamic performance of the proposed rectifier operating at unity power factor and drawing low harmonic AC current from the utility/source.

As shown in FIG. 2A, the 5-level circuit 115 working in the rectifier mode has only 6 switches, with which it generates 5 voltage levels. In some embodiments, the redundant switching states facilitates voltage balancing between DC links. In some other embodiments, the 5-level rectifier is proposed in this disclosure may operate at unity power factor and eliminate input AC current harmonics since when working in boost mode. The low THD 5-level voltage waveform of the 5-level rectifier affects the line current harmonics directly so that the inductive filter could be smaller than 2-level rectifier one in order to reduce the size of the product. Since the auxiliary DC capacitor voltage could be balanced just by the redundant switching states, the voltage/current regulation of the 5-level rectifier is same as a full-bridge one with single output DC terminal which could be done through a cascaded PI controller.

The 5-level rectifier configuration and switching states will now be discussed. Provided herein is a voltage balancing based switching technique. With respect to the described design, practical tests have been performed in different conditions such as load changes, AC main variation, which tests have shown good dynamic performance for the battery charger converter 100 in the rectifier mode.

Working as a rectifier, the 5-level circuit 115 has two DC links. The main DC link comprises the high-voltage capacitor 120 that is voltage regulated to supply DC load. The voltage across the high-voltage capacitor 120 is designated $V_o$ herein. A secondary DC link comprises the auxiliary capacitor (low-voltage capacitor 125). The voltage across the low-voltage capacitor 125 is designated $V_c$ herein. $V_c$ has half the voltage amplitude of the main terminal ($V_O$) and is used for forming the rectifier input voltage ($V_{in}$), across the first and second terminals, as a 5-level quasi-sine wave. Therefore, $V_C=E$, $V_O=2E$ and 5 voltage levels include 0, ±E, ±2E. It will be appreciated by those skilled in the art that $V_c$ may be in range close to half and not necessarily half the voltage amplitude of main terminal ($V_O$) without exceeding the scope of the invention as disclosed herein.

Operating in boost mode means herein that the output DC voltage is higher than the input AC peak value. In the present example:

$$V_{S-rms} = 120 \text{ V} \rightarrow V_{S-peak} = 120\sqrt{2} = 170 \text{ V}$$

Based on the peak value of the AC grid, the DC voltage was selected at 200V. Now since $V_c$ is half of $V_o$, we have:

$$V_O = 200 \text{ V} \rightarrow V_C = 100 \text{ V}$$

To that end, the output terminal voltage $V_O$ is regulated at 200V to feed the DC load which in this example is an EV battery bank. Moreover, the auxiliary capacitor voltage $V_C$ is balanced at 100V in order to generate 5-level voltage waveform as $V_{in}$.

Based on the above-selected voltages, the two high-voltage power switches 130a, 130b are selected to withstand 200V. The auxiliary power switches see only approximately half the voltage of the high-voltage power switches 130a, 130b, which in this example is 100V.

Table 1 shows the switching states of the 5-level circuit 115. Each pair of switches, which in this example include the pair of high-voltage power switches 130a, 130b, the pair of intermediate low-voltage power switches 140a, 140b, and the pair of terminal low-voltage power switch 150a, 150b, are complementary, meaning that when one is open the other is closed and vice versa.

TABLE 1

Switching States of the 5-level Circuit 115 working in the rectifier mode

| Switching State | S1 | S2 | S3 | $V_{in}$ | $V_{in}$ Voltage |
|---|---|---|---|---|---|
| 1 | 1 | 0 | 0 | $V_O$ | +200 V |
| 2 | 1 | 0 | 1 | $V_O - V_C$ | +100 V |
| 3 | 1 | 1 | 0 | $V_C$ | +100 V |
| 4 | 1 | 1 | 1 | 0 | 0 V |
| 5 | 0 | 0 | 0 | 0 | 0 V |
| 6 | 0 | 0 | 1 | $-V_C$ | −100 V |
| 7 | 0 | 1 | 0 | $-V_O + V_C$ | −100 V |
| 8 | 0 | 1 | 1 | $-V_O$ | −200 V |

It is observable that based on each configuration of switches, a path is provided to flow the current through the converter and a voltage level is appeared at the input that together form the 5-level voltage waveform. That smooth waveform can have low total harmonic distortion (THD) and can affect directly on the drawing current harmonic contents (If there is harmonic in voltage waveform, then it will be injected into the current waveform, too. A low harmonic voltage waveform causes a low harmonic current waveform). The naturally reduced amount of THD permits the use of a smaller filter in the AC line with acceptable performance compared to the larger filter typical of 2-level converters.

As will be noted from table 1, the high-voltage power switches 130a, 130b, are in fact only switched twice per period. However, the auxiliary power switches may be switched at a much higher frequency, e.g., switching between redundant states (e.g., states 2 and 3) multiple times before moving on to the next non-redundant state (e.g., state 4). In certain embodiments, the low-voltage power switches may be switched at a high frequency, of at least, or more than, 1 kHz, for example, greater than 10 kHz. In this particular example, the switching frequency may be of 48 kHz.

Voltage balancing for the present battery charger rectifier 100 will now be described. As will be seen in Table I, there exist some redundancies among switching states—that is to say that there exist switching states resulting in a same $V_{in}$ voltage such as states 2 and 3 or states 6 and 7. Since the main output is $V_O$ and is controlled by an external PI controller, the redundant switching states can help in several ways. One benefit of the redundant switching states is that reducing the voltage error of $V_O$ results in lowering the external controller burden. Moreover, balancing the auxiliary capacitor voltage $V_C$ allows providing 5 identical voltage levels in order to generate a low THD quasi-sine waveform.

In FIGS. 2B and 2C, the current paths 205, 210 for redundant states 2 and 3, respectively, are shown to better illustrate the effect of redundant switching states on the DC links voltage balancing. The DC links polarities are assumed as shown in the figures. They can be charged or discharged based on the current sign. At state 2, assuming that the current is positive, then the high-voltage capacitor 120 is charged while the low-voltage capacitor 125 is discharged due to its reversed polarity. Thus, $V_O$ and $V_C$ are increased and decreased, respectively. However, at state 3, the low-voltage capacitor 125 will be charged by a positive current in state 3. Those states will affect reversely if the current sign is negative. It should be also noted that the $V_O$ will be decreased due to discharging on the load whenever it is not connected through the AC source.

Table II similarly shows the effect of each switching state on the high-voltage capacitor 120 and on the low-voltage capacitor 125, which gives helpful information to design the associated voltage balancing technique.

TABLE 2

Effect of Switching States on $V_O$ and $V_C$

| Switching State | Line Current Sign | $V_{in}$ | Effect on $V_O$ | Effect on $V_C$ |
|---|---|---|---|---|
| 1 | $i_s > 0$ | $V_O$ | Charging | Discharging |
| 2 | $i_s > 0$ | $V_O - V_C$ | Charging | Discharging |
| 2 | $i_s < 0$ | $V_O - V_C$ | Discharging | Charging |
| 3 | $i_s > 0$ | $V_C$ | Discharging | Charging |
| 3 | $i_s < 0$ | $V_C$ | Discharging | Discharging |
| 4 | $i_s \geq 0$ | 0 | Discharging | Discharging |
| 5 | $i_s \leq 0$ | 0 | Discharging | Discharging |
| 6 | $i_s > 0$ | $-V_C$ | Discharging | Discharging |
| 6 | $i_s < 0$ | $-V_C$ | Discharging | Charging |
| 7 | $i_s > 0$ | $-V_O + V_C$ | Discharging | Charging |
| 7 | $i_s < 0$ | $-V_O + V_C$ | Charging | Discharging |
| 8 | $i_s < 0$ | $-V_O$ | Charging | Discharging |

Since the proposed converter may be a grid-connected one and the associated controller already includes a current sensor, there it is possible to avoid having additional sensors and the associated costs. A same line current sensor feedback signal may be used in the voltage balancing technique. Two voltage sensors may be used as DC voltages feedbacks, and the switching technique may include a multicarrier PWM manipulated by the voltage effects listed in Table II. The switching technique selects the redundant switching state based on the feedbacks received from the current and voltages sensors.

Figure 2D:
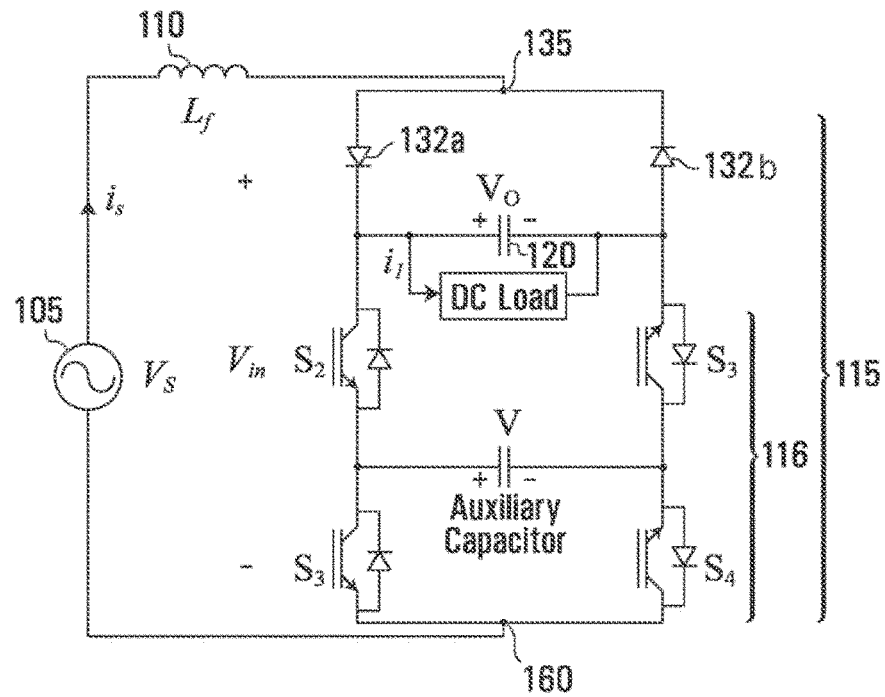
FIG. 2D shows a circuit diagram of a 5-level topology circuit of a unidirectional/rectifier apparatus according to a particular example of implementation.

As shown in FIG. 2D, in some embodiments the high-voltage power switches 130a, 130b can be replaced with two diodes 132a and 132b providing a 5-level unidirectional rectifier that can only convert AC voltage to DC as a unidirectional charger. It will be understood by those skilled in the art that use of a 5-level unidirectional rectifier does not affect the way invention works and can be used as an alternative for the 5-level circuit in all embodiments disclosed herein.

Figure 2E:
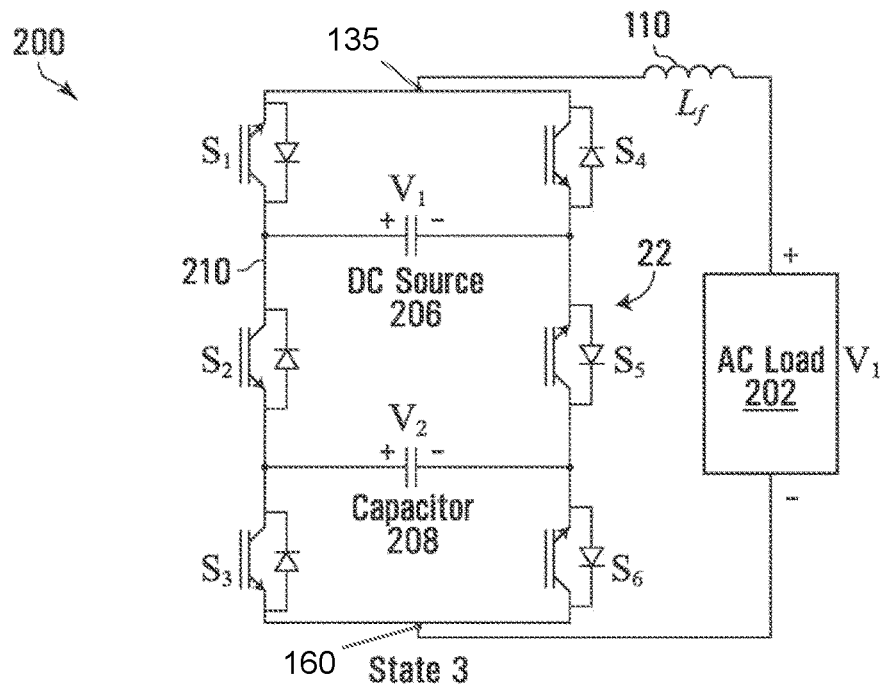
FIG. 2E shows a circuit diagram of a battery apparatus converter with a 5-level topology circuit working in an inverter mode, in accordance with one embodiment.

In some embodiments, the 5-level circuit can operate in bidirectional states. That means that it can convert voltage/current from AC to DC in a rectifier mode as shown in FIG. 2A or from DC to AC in an inverter mode as shown in FIG. 2E. When working in the rectifier mode, the invention has a DC output.

In the inverter mode, the high-voltage capacitor ($V_O$) is connected to a DC source like an isolated DC source, a battery (including an EV battery) or a solar panel, the 5-level circuit can generate AC voltage/current from those DC inputs. That AC current can be injected into the network as the grid-tied mode also known as vehicle to grid ("V to G") of operation or can supply usual AC loads as a power supply also known as vehicle to house ("V to H"). The inverter mode can be used in a Vehicle-to-Grid method in which the car battery can involve in peak load sharing of the utility or supply some critical loads at home when there is no electricity.

Referring to FIG. 2E, there is illustrated a topology 200 for the 5-level power converter working in the inverter mode, in accordance with one embodiment. An AC load 202 is connected across the first terminal 135 and the second terminal 160, which correspond to the only nodes in the circuit where only Switching elements are connected. The voltage produced between the first terminal 135 and the second terminal 160 is the inverters output voltage (V), which is illustratively a five-level Pulse Width Modulation (PWM) waveform.

Although PWM is referred to herein when describing the control strategy implemented for the proposed 5-level inverter, it should be understood that other control techniques may be used. Such as but not limited to Selective Harmonics Elimination PWM and Optimized Harmonics Stepped Waveform. PWM such as the Shift PWM technique, the Sinusoidal Natural PWM technique, and the Programmed PWM technique may be used. Open loop and closed loop techniques may be used. Examples of Open-loop techniques are Space Vector and Sigma Delta. Examples of Closed loop techniques are Hysteresis Current Controller, Linear Current Controller, DeadBeat Current Controller, and Optimized Current Controller.

In the illustrated embodiment, the 5-level inverter circuit 200 can generate five different output Voltages using the various combinations of Switches at on/off states, as will be discussed further below. The six switches 130a, 130b, 140a, 140b, 150a, and 150b may be implemented using bipolar junction transistors (BJT). A parasitic diode, implicitly present due to the nature of the BJT, is illustrated to indicate the direction of bias of the transistors, namely reverse bias, such that the transistors behave as switches and not as short circuits. It should be noted that alternative means of implementing the Switches are possible. Such as thyristors, e.g., Gate Turn-Off thyristors (GTOs) or Integrated Gate Commutated Thyristors (IGCTs), relays, Isolated Gate Bipolar Transistors (IGBTs), Metal-Oxide-Semiconductor Field-Effect Transistors (MOSFETs), or any other suitable controllable switch.

The circuit 200 further comprises elements as in 206 and 208, which are connected within the closed loop such that each element 206, 208 is connected to four of the switching elements 130a, 130b, 140a, 140b, 150a, and 150b. The element 206 is illustratively a DC source (i.e., a battery, solar panel, or the like) while the element 208 is a dependent Voltage source, e.g., an energy storage device such as a capacitor (as illustrated) or a combination of capacitors (not shown), used as an auxiliary power source.

Although the circuit 200 is illustrated as comprising one element 208 to implement a five-level inverter, it should be understood that additional elements 208 may be provided to achieve more levels at the output of the inverter, as will be discussed further below.

Figure 3A:
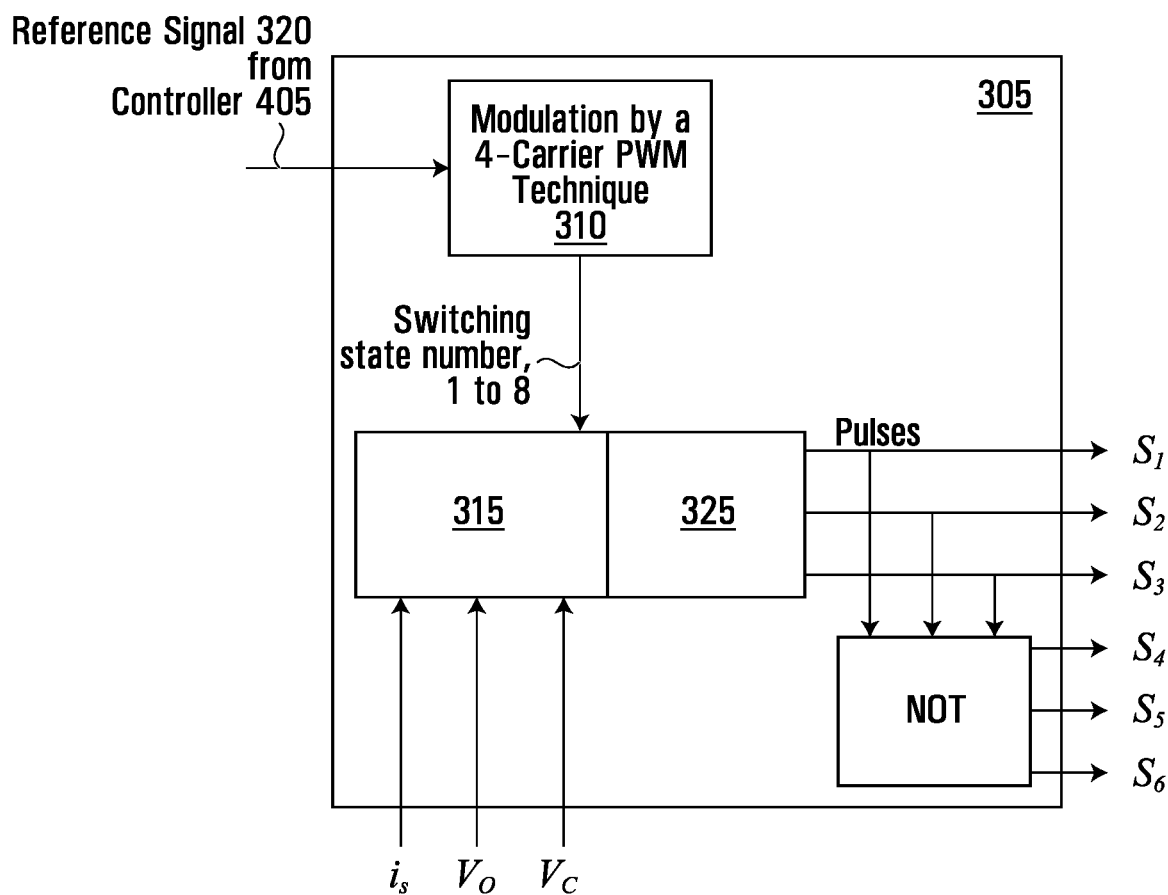
FIG. 3A shows a block diagram of a modulator with voltage balancing of the battery apparatus converter of FIG. 1A working in a rectifier mode.
Figure 3B:
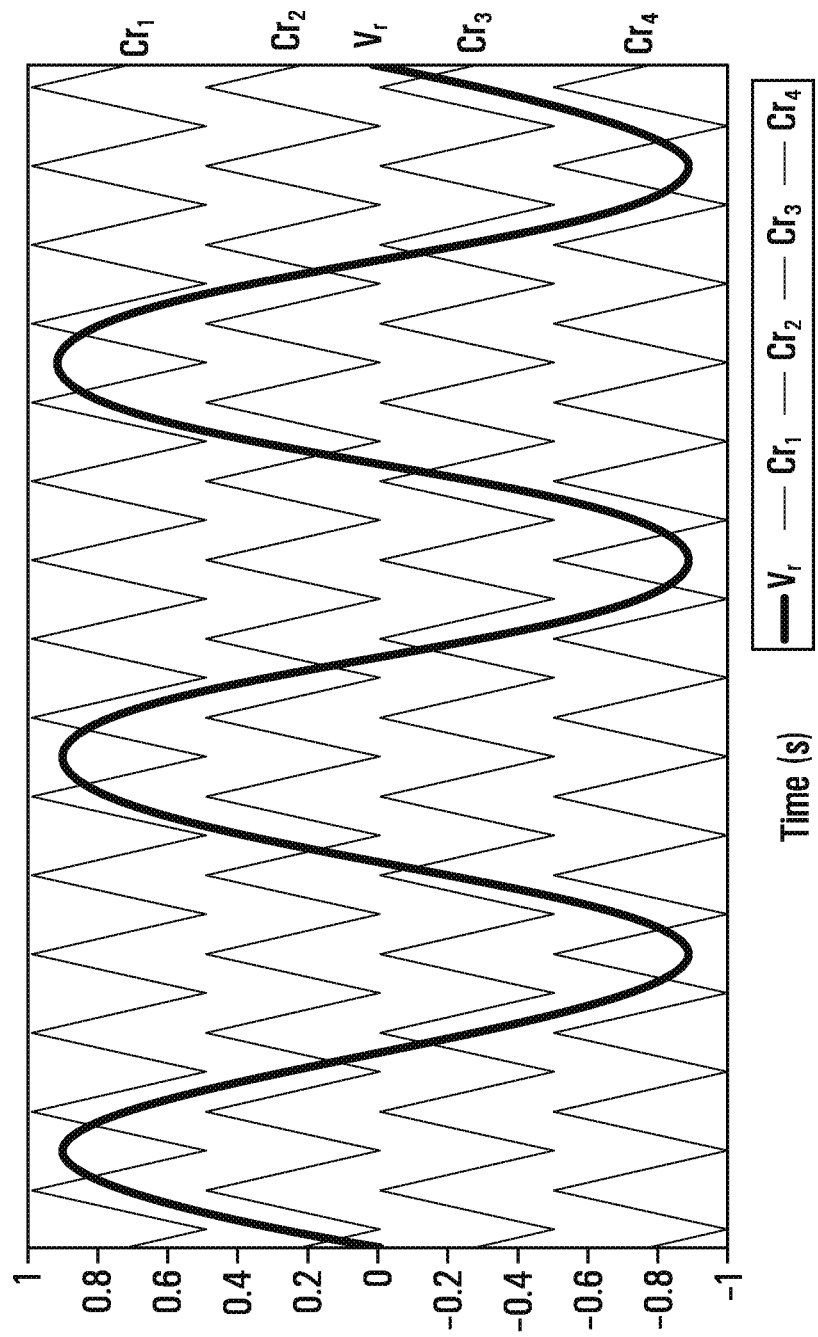
FIG. 3B shows a signal graph showing a 4-carrier pulse-width modulation technique used in the modulator of FIG. 3A.
Figure 3C:
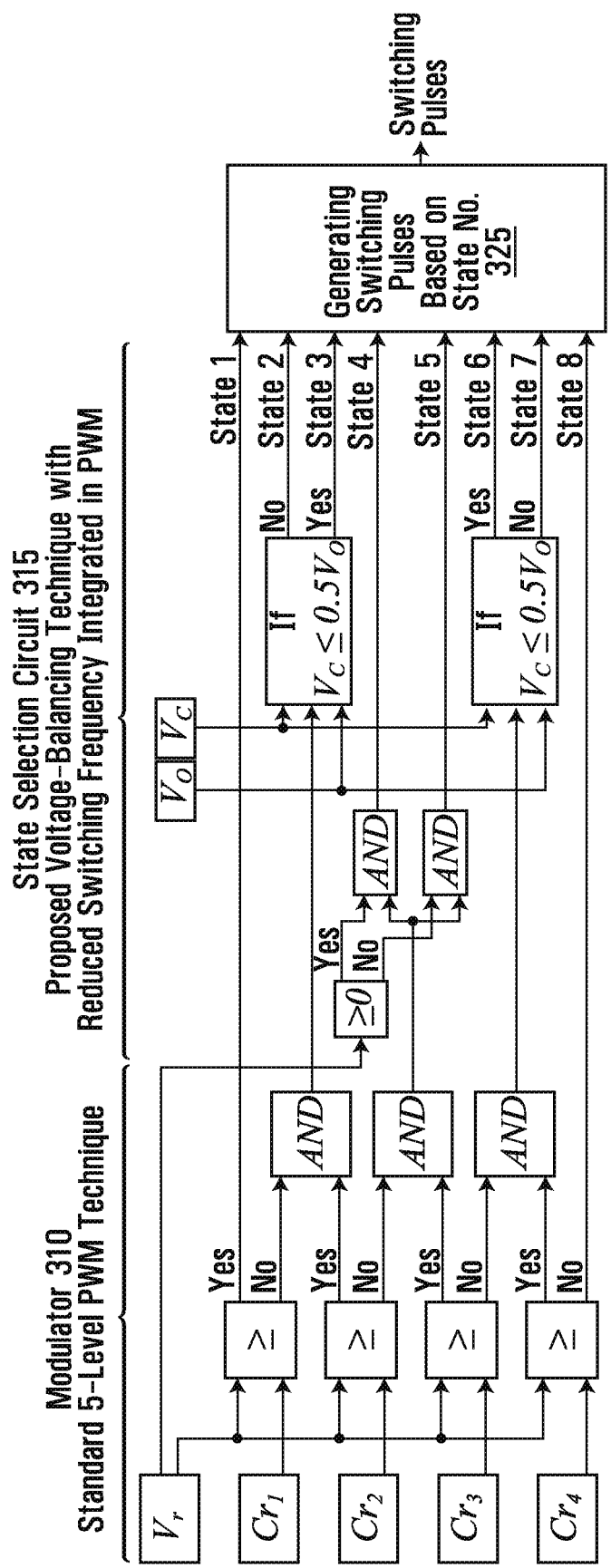
FIG. 3C shows a circuit diagram showing elements of a controller of the charger of FIG. 1A working in a rectifier mode.
Figure 3D:
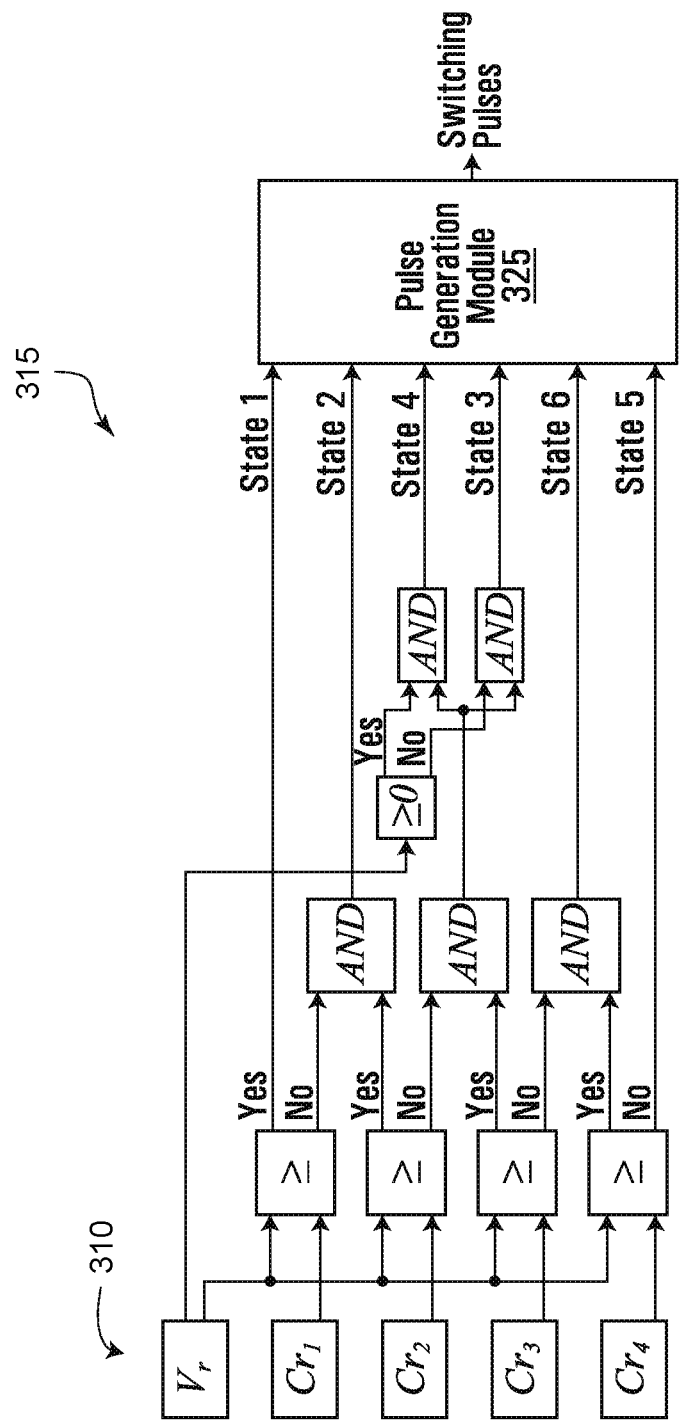
FIG. 3D shows a circuit diagram showing elements of a controller of the battery apparatus converter of FIG. 2E working in an inverter mode.
Figure 3E:
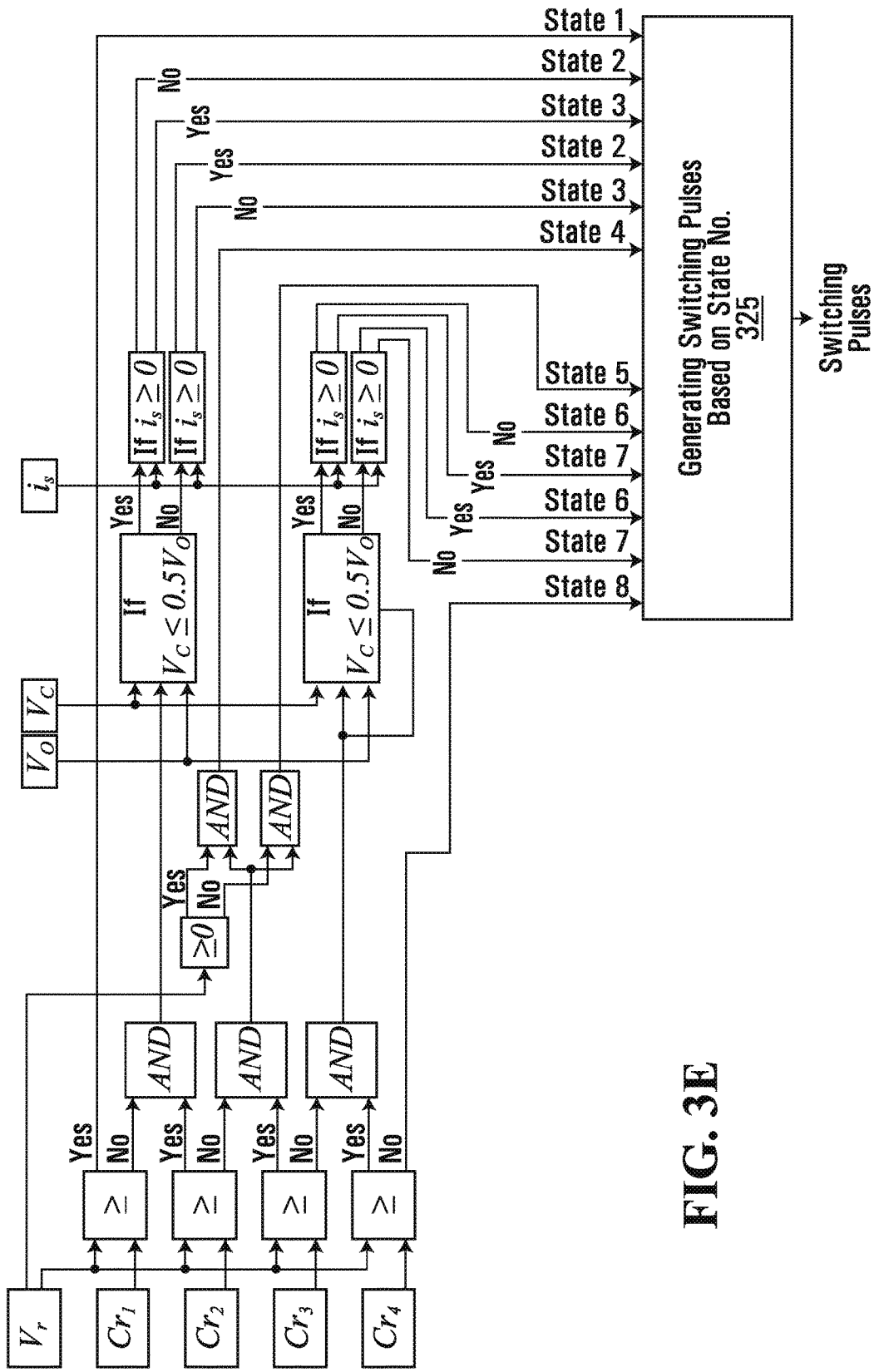
FIG. 3E shows logic elements of both the modulator and the state selection circuit to provide 8 signals indicative of respective states using both voltage and current feedback.

FIG. 3A illustrates a schematic of the voltage balancing technique integrated into a modulator with voltage balancing 305. As shown, in this example a modulator 310 is used that provides 5-level PWM. In this example, a 4-carrier PWM technique is used to modulate the reference signal 320, as shown in FIG. 310. The reference signal 320 therefor is provided from the controller which is described below. The output of the modulator 310 is provided to a state selection circuit 315 which enforces the logic of Table I and Table II to generate inputs to the switches, here in the form of signals to S1, S2, and S3 and inverse (NOTed) version of these signals to S4, S5, and S6, respectively. The state selection circuit 315 provides a rapid voltage balancing procedure integrated into switching technique, thanks to which it is expected that a small size capacitor would be suitable for the auxiliary capacitor. A schematic illustration of the algorithm (whether implemented in software executed by a processor or using circuitry) used is illustrated in FIG. 3C, which shows logic elements of both the modulator 310 and the state selection circuit 315 to provide 8 signals indicative of respective states using voltage feedback. FIG. 3E illustrates the same logic elements when both current and voltage feedback is used. As illustrated in FIGS. 3C to 3E, in some examples, the modulator 310 receives the $V_r$ or reference signal 320 from the controller 405 and performs comparisons between the reference signal 320 and 4-carrier signals ($Cr_1$, $Cr_2$, $Cr_3$, $Cr_4$) using PWM technique before providing the result of these comparison as comparison signals to state selection circuit 315.

Alternatively, FIG. 3D shows logic elements of both the modulator 310 and the state selection circuit 315 to provide 5 signals indicative of respective states without use of any feedback.

These signals are then used by a pulse generator module 325 to generate the pulse outputs to the switches. In one embodiment, the pulse generator 325 may be a switch table which can be programmed by a microcontroller.

It will be appreciated by those skilled in the art that the digital switching signals may go through a gate driver before going to the switches.

In FIG. 3A, it is shown that a voltage feedback is used in voltage balancing part. However, the voltage balancing unit can use voltage or current feedback. When both are used, it is possible to balance the capacitor voltage more robustly.

A schematic illustration of one algorithm that may be used is illustrated in FIG. 3E, which shows logic elements of both the modulator 310 and the state selection circuit 315 to provide eight signals indicative of respective states using both voltage and current feedbacks as shown in. This arrangement has comparatively good performance.

Referring back to 3A, in one embodiment, the block 315 determines the best choice for switching state number (see Table 1), and then sends it to module 325. Switching pulses (S1 to S6) will be generated based on the state number. For example, if State 1 is determined by block 315, then according to Table I, S1, S5 and S6 will be ON and S2, S3 and S4 will be OFF that are complementary.

Figure 4:
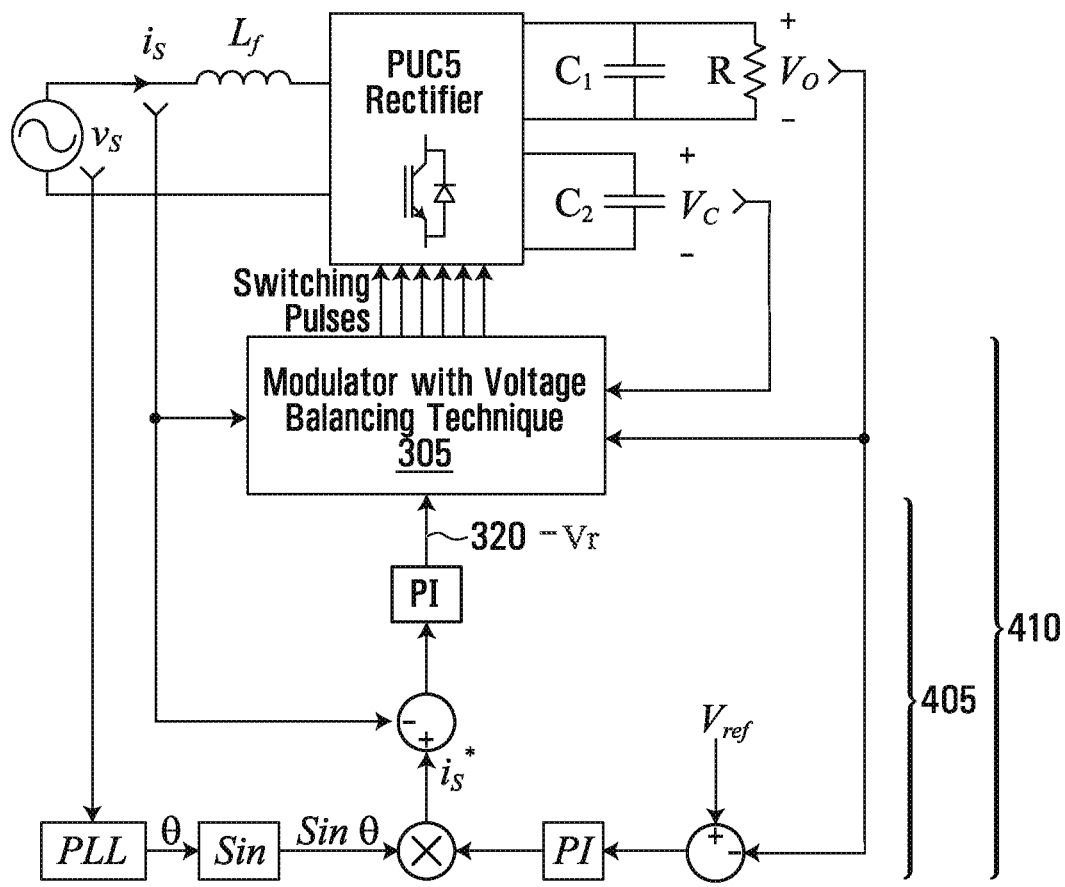
FIG. 4 shows a block diagram of the battery converter of FIG. 1A working in a rectifier mode including controller circuitry.

In one embodiment, the reference signal 320 in FIG. 4 can be considered as $V_r$ in FIG. 3.

A controller 410 for the system the system may employ a cascaded proportional-integral (PI) controller, which will now be described. As mentioned above, the present exemplary configuration may be used as a single-DC-source inverter since the auxiliary capacitor voltage is balanced through the switching states. Although some of the proposed topologies has been proposed for rectification with two DC capacitors, in the present embodiment the auxiliary capacitor is voltage controlled by the designed switching technique and does not require any additional voltage regulator. Hence, we may use only one external voltage controller to fix the output DC terminal to a desired level, which in the present example is 200V. As a result, a simple cascaded PI Controller may be used to regulate the output DC voltage as well as to control the input current and synchronize it with the grid voltage to ensure power factor correction (PFC) operation of the rectifier. The controller 410 is responsible for regulating $V_o$ and $i_s$, which it does in response to an input Vref from a battery management system (BMS), such as may be provided on an EV.

In some examples of the present disclosure, the controller shown in FIG. 4 (block 405) includes a current loop and a voltage loop. The voltage loop is in charge of fixing the C1 voltage at the reference level. The voltage error is minimized by a Proportional-Integral (PI) controller, and its output goes into the current loop as the current reference value. The current loop takes a sample from grid voltage (vs) and sends the current error to another PI controller in order to adjust the phase shift between the vs and is. (preferably a zero-degree phase shift for power factor correction called PFC, but it can be adjusted to any value for reactive power exchange with the grid) since the two loops are in series, it is called a linear cascaded PI controller. The output of the controller which is the reference signal (unit 320) goes to the modulation unit 305 to produce the switching pulses based on redundancies in order to balance the second capacitor voltage (C2).

It will be appreciated by those skilled in the art that other types of controllers such as nonlinear ones, model predictive, sliding mode, or other suitable controllers known in the art may be alternatively used with the present disclosure.

The controller can be provided by a processor-based microcontroller with control software that uses inputs from sensors and provides the gate control signal outputs following the logic described herein for a digital system. The controller can also comprise an analog circuit using active and passive components. The analog circuit may take some feedback from the system voltage and current and sends the reference signal to the modulator.

FIG. 3D illustrates a schematic illustration of the algorithm used in some embodiments of the present disclosure wherein the state selection circuit 315 to provide 8 signals indicative of respective states uses no sensor to deliver the signals indicative of respective states ("sensor-less"). Furthermore, FIG. 3D illustrates logic elements of a switching unit 340 used in an embodiment of the present invention when the charger converter works in the inverter mode. It will be appreciated by those skilled in the art that the switching pulse generation and voltage balancing of the auxiliary capacitor (the lower cap) in the 5-level configuration are applicable to the convertor both when it works in the rectifier mode and inverter mode of operation and are not limited to one operational mode.

Figure 10A:
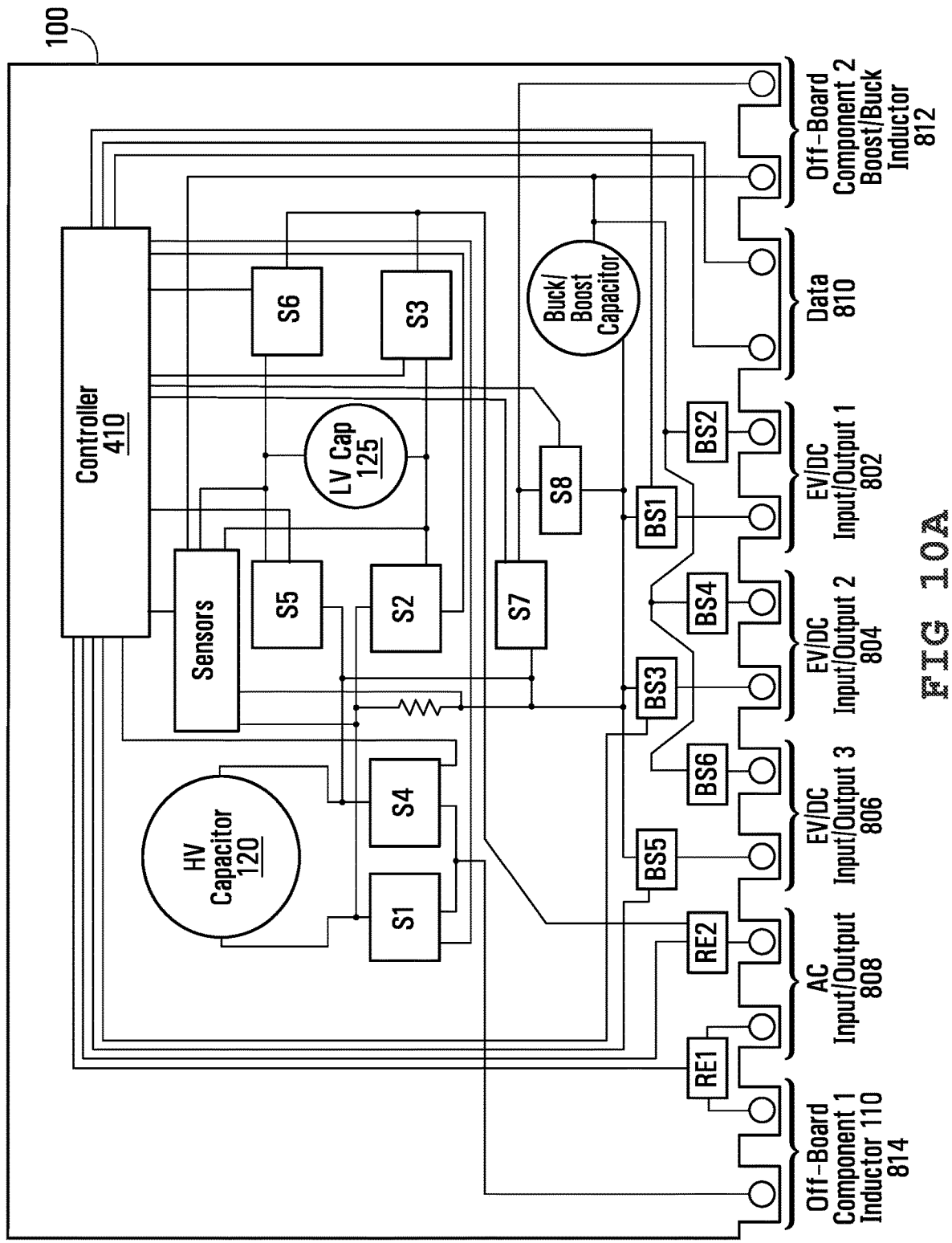
FIG. 10A is a schematic diagram of a power converter module according to one embodiment.

With reference to FIG. 10A, it will be understood that the controller 410 may also control a DC to DC buck or boost converter in response to the desired output DC voltage requested by the BMS. In FIG. 10A, this is a simple buck or boost converter controlled by switch S7 using the feedback of the measured DC output voltage using a sensor, also shown in FIG. 11A as block 1702.

It will be appreciated by those skilled in the art that any type of buck or boost or buck-boost converter known in the art can be used without affecting the manner in which the invention works. Two important topologies are called buck-boost converter which can produce a range of output voltages, ranging from much larger (in absolute magnitude) than the input voltage, down to almost zero.

The first topology is the inverting topology in which the output voltage is of the opposite polarity than the input. This is a switched-mode power supply with a similar circuit topology to the boost converter and the buck converter. The output voltage is adjustable based on the duty cycle of the switching transistor.

The second topology is a buck (step-down) converter combined with a boost (step-up) converter in which the output voltage is typically of the same polarity of the input, and can be lower or higher than the input. Such a non-inverting buck-boost converter may use a single inductor which is used for both the buck inductor mode and the boost inductor mode, using switches instead of diodes.

In the example of FIG. 4, controller 410 regulates the $V_o$ voltage at a reference level of $V_{ref}$ received as input and also controls the grid current $i_s$ to eliminate or reduce its harmonics and make it in-phase with grid voltage as unit power factor operation or close thereto (e.g., PF=99.99%). An exemplary implementation of the controller 410 is shown schematically in FIG. 4 where current and/or voltage from the sensor is sampled by the controller 410 as required (e.g., about every 20 microseconds).

The voltage regulator tries to minimize the $V_O$ error by adjusting the current reference ($i_s$') amplitude. The shape of the current reference is generated in this example through a unit sample of the grid voltage to ensure the PFC mode. Eventually the controller output 320 is modulated by the standard 4-carrier PWM technique to send the required pulses.

Experimental results for the battery charger rectifier 100 will now be described. In one particular example of testing, practical tests have been carried out on a silicon carbide (SiC) based 5-level converter. Six 1.2 KV 40 A SiC MOSFETs type SCT2080KE were used as active switches. The proposed voltage balancing approach integrated into switching technique and the cascaded controller was implemented on dSpace 1103, and consequently, switching pulses were sent to the 5-level switches. The tested system parameters are listed in Table 4.

TABLE 4

| Practical Test Parameters | |
|---|---|
| Grid Voltage Frequency | 60 Hz |
| Grid Voltage | 120 V RMS |
| Output DC Voltage | 200 V |
| DC Load | 38 Ω |
| Switching Frequency | 48 KHz |
| Inductive Filter (Lf) | 2.5 mH |
| High Voltage Capacitor 120 | 2 mF |
| Low Voltage Capacitor 125 | 50 μF |

In alternate embodiments, the AC input (grid) voltage may be about 240V RMS, and the DC load may be greater than 350 V, as provided by boost mode rectification in the manner described herein.

Figure 5:
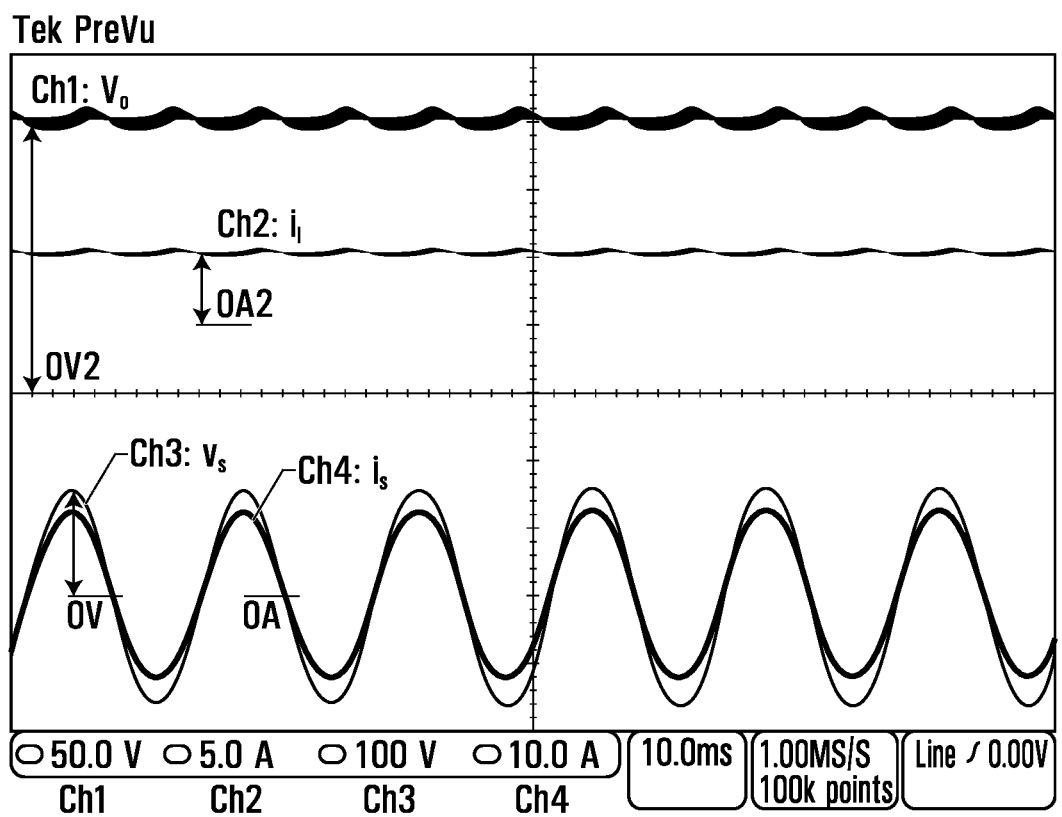
FIG. 5 shows a signal graph illustrating steady state results of the battery converter of FIG. 1A working in the rectifier mode at 1 kW operation.

The steady-state results at 1 kW have been captured as seen in FIG. 5. As shown, the output DC terminal voltage 3 was regulated at 200V (Ch1 with reference point shown by 0V2 corresponding to point 1 on the vertical axis and with 4 units which as indicated at the bottom of diagram each represent 50.0 V resulting in 200V) with acceptable voltage ripple less than 10%. Moreover, due to effective voltage balancing of $V_C$, the $V_{in}$ has been formed by 5 identical voltage levels of 0, ±100, ±200V with lower harmonic pollution than a 2-level voltage waveform. Moreover, PFC operation of the battery charger rectifier 100 can be observed through the input voltage and current waveforms $v_s$ (Ch3 with reference point shown by 0V corresponding to point 4 on the vertical axis—as indicated at the bottom of diagram each represent 100.0 V) and $i_s$ (Ch4 with reference point shown by 0A2 corresponding to point 4 on the vertical axis—as indicated at the bottom of diagram each represent 10.0 A.) Eventually, the load current $i_l$ (Ch2 with reference point shown by 0A2 corresponding to point 2 on the vertical axis—as indicated at the bottom of diagram each represent 10.0 A) was measured at almost 5 A which demonstrates an achievement of the 1 kW operating system.

Figure 6:
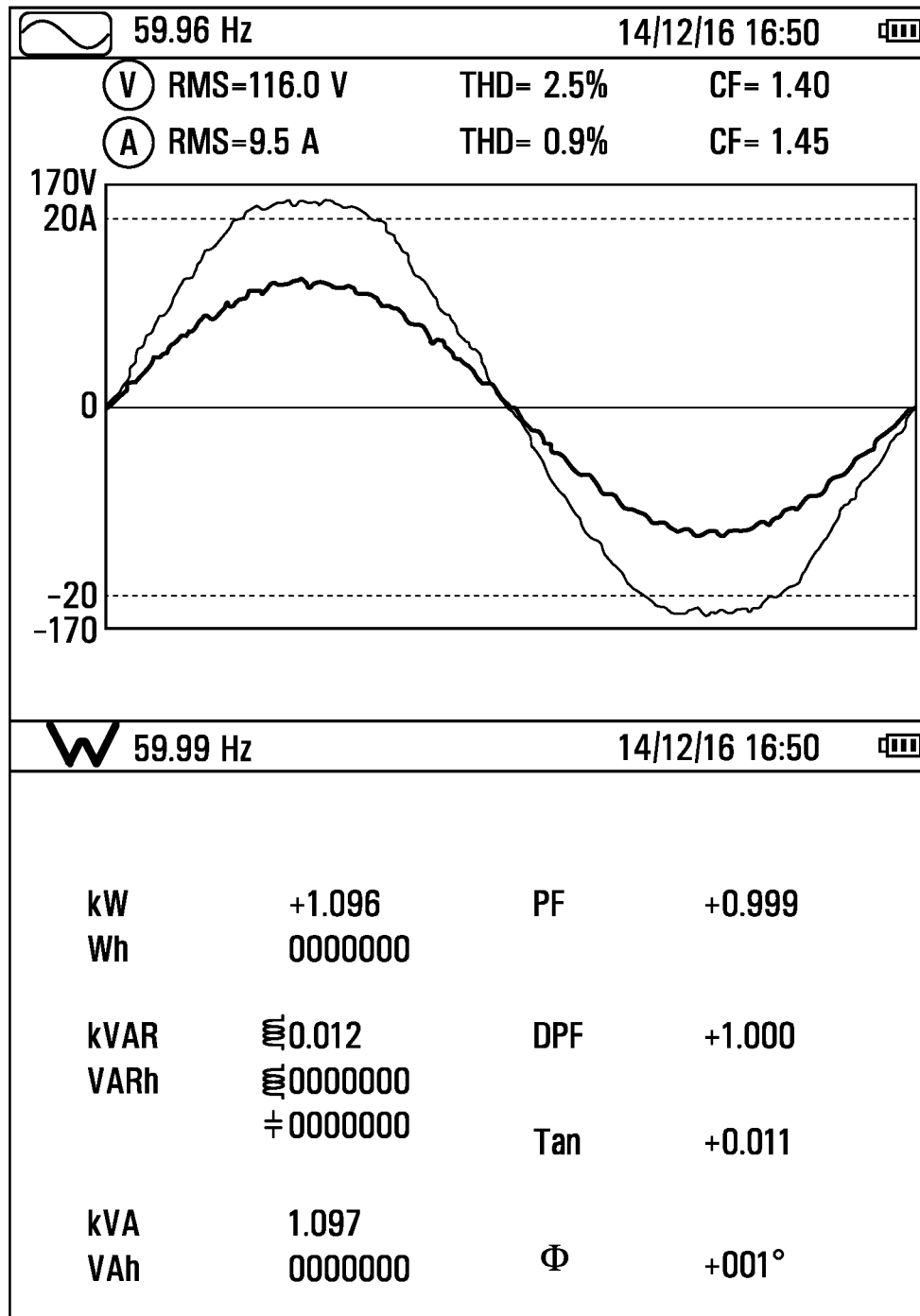
FIG. 6 shows a screenshot of a power analyzer showing some parameters of the battery apparatus converter of FIG. 1A working in the rectifier mode measured by the power analyzer.

FIG. 6 depicts some other parameters measured by an AEMC™ power analyzer. It is to be appreciated that the battery charger rectifier 100 was tested at 1 kW with the highest possible power factor (close to unity) which reduces the amount of reactive power significantly and promises the good performance of the controller in synchronizing the line current with the grid voltage. Moreover, the current THD is also low thanks to the low harmonic pollution of the multilevel voltage waveform generated by the 5-level rectifier (The standards of IEEE519 and IEC61000 require a line current with THD of less than 5%).

Figure 7:
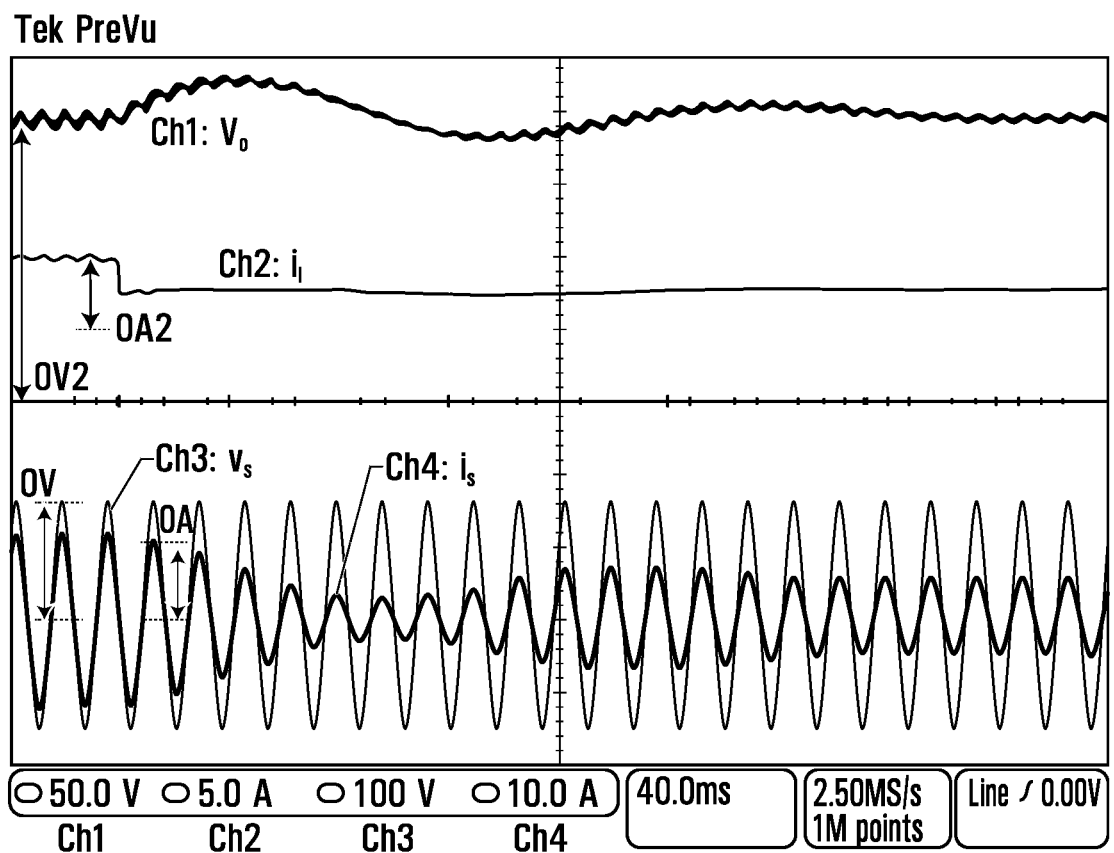
FIG. 7 shows a signal graph illustrating the performance of the battery apparatus converter of FIG. 1A working in the rectifier mode during a 50% change I the DC load.

In this testing, a 50% load change was eventually made intentionally (from 38Ω to 75Ω) in order to examine the dynamic performance of the controller. As shown in FIG. 7, the load current was reduced to almost half of the initial amplitude. Consequently, due to change in the amount of energy delivered to the load, the $V_O$ (Ch1 with reference point shown by 0V2 corresponding to point 1 on the vertical axis and as shown at the bottom of diagram each unit representing 50.0 V) varied but was well stabilized by the controller and voltage balancing technique without unexpected over or undershoot. Moreover, the input AC current was kept synchronized with the grid voltage while its amplitude was changing to reach the steady-state mode. It will be appreciated that the current harmonic is also eliminated during the transition. In other words, while a 50% reduction in the DC load (the load current $i_l$ (Ch2) is reduced to 50%—reference point 0A2 corresponding to pint 2 on the vertical axis) is observed, the DC voltage is controlled at the desired level.

The practical results of the battery charger rectifier 100 have shown good dynamic performance of the controller and voltage balancing technique which has been integrated into the modulation process. The auxiliary capacitor voltage is kept regulated at desired level with low voltage ripple due in part to such fast and accurate voltage balancing approach results in generating a 5-level quasi-sine voltage waveform at the input of the rectifier with low harmonic contents. Such multilevel waveform allows the use of small size filter to eliminate the line current harmonics. The battery charger rectifier 100 may, therefore, be well suited potential candidate to be used as industrial rectifier in traction systems or battery charger for EV applications.

A voltage balancing technique has been designed and integrated into switching pattern to regulate the auxiliary capacitor voltage resulted in generating 5 identical voltage levels at the input of that rectifier to form a 5-level smooth voltage waveform with low harmonic content. A standard cascaded PI controller has been implemented on the proposed rectifier in part due to having a single DC terminal without any split capacitors at the output. Practical tests shown good dynamic performance of the battery charger rectifier 100, implemented voltage balancing technique and controller during steady state and load change conditions. It may also be a potential product for the PFC rectifier market.

To provide a 7-level/3-capacitor implementation, two more power switches and one additional low-voltage capacitor would need to be added. The modulation block would also be changed to have six carrier waves. The voltage balancing unit will be changed because there would be more switching states to charge and discharge the capacitors and regulate their voltages.

Figure 8A:
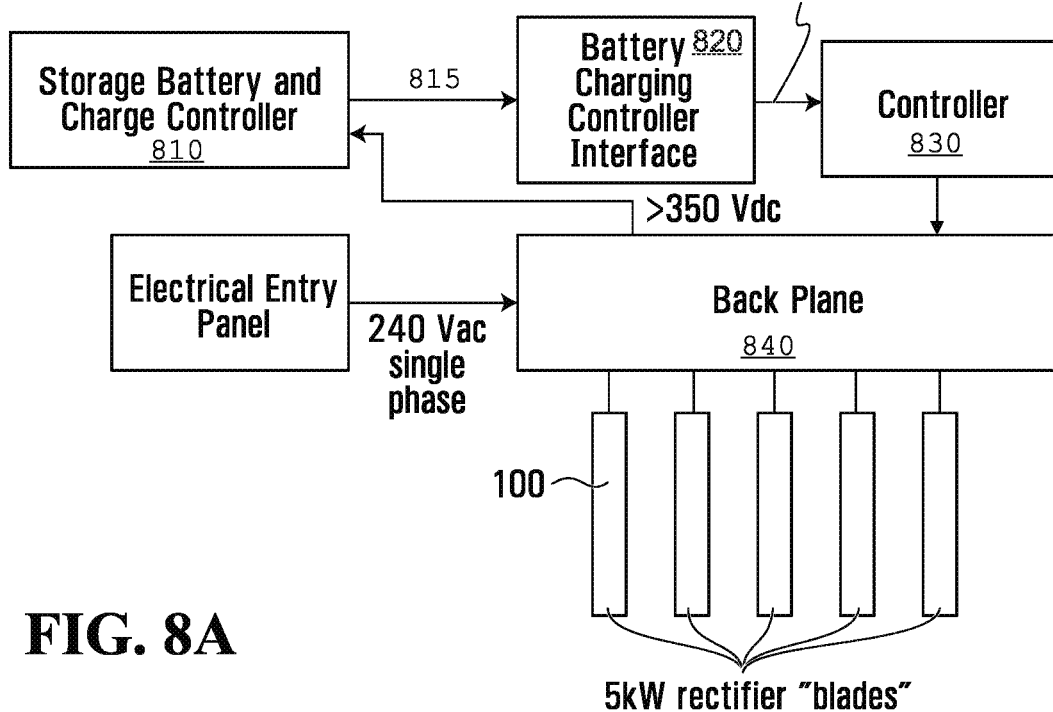
FIG. 8A is a block diagram showing a modular converter battery charging system.

The battery charger rectifier 100 may be provided in a battery charger alongside other parallel battery charger rectifier circuits of like construction, as illustrated in FIG. 8A, each working in parallel to provide DC power to the load. To this end, the battery charger may comprise a housing including a connector backplane having a number of sockets for receiving a plurality of modules each comprising a battery charger rectifier of the type described herein, although a common controller can be used as illustrated in FIG. 8A. An advantage of this modular approach can be that a backplane can be first installed, possibly using the services of a professional electrician, while an end-user may add or replace the modules 100 as required. The modular approach illustrated is not limited to any particular number of modules 100; however, Applicant has found that, in particular using the rectifier design described hereinabove, that a 5 kW rectifier module is efficient, and 6 of such modules provides a combined DC charging power of about 30 kW. This amount of power is suitable for high-speed battery charging while being feasible within the available power budgets of most conventional electrical entries.

For practical implementation, a battery charger comprising the battery charger rectifier 100 may comprise a user-interchangeable DC vehicle charging cable and charging plug, e.g., having a compatible format for fitting a standardized plug/socket (i.e., SAE J1772, ChaDeMo, or other) in an EV.

FIG. 8A also shows how the storage battery and charge controller (also known as a battery management system or BMS) 810 is connected over a charge cable 815 to a battery charging controller interface 820 and a controller 830. The charging cable 815 can provide the data path to the interface 820 as well as the high-voltage DC conductors connected to the back plane 840. The interface 820 can comprise the interface known in the art of DC EV chargers that receive from the BMS data or signals that indicate information concerning voltage and/or current parameters for charging. The interface 820 can be associated with a computer that can be used to host controller 830. The computer 830 can provide the Vref value to the back plane 840 for the one or more rectifier circuits 100. Whether part of the circuits 100 or using a sensor that is part of the back plane 840, the computer 830 can receive the current delivered to the battery 810. The data interface, AC input and DC output connections of a module 100 are illustrated in FIG. 10A and will be described in detail below. The computer 830 can be any suitable processor having program memory for managing changing control.

Figure 8B:
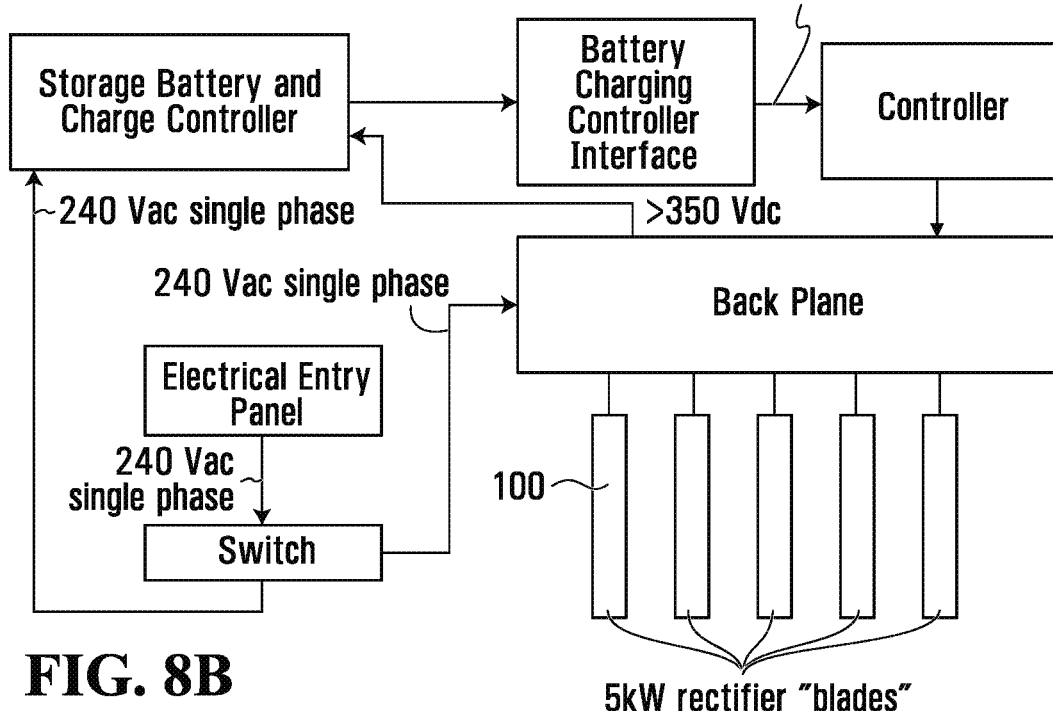
FIG. 8B is a block diagram showing a charger with both an AC and a modular converter battery charging system.

In some embodiments of the present invention, as FIG. 8B illustrates, the AC current coming from the electrical entry panel goes to a connector such as a switch which can direct the AC current either to the Storage battery and charge control unit providing the user with a level 2 AC EV battery charger with AC output or alternatively to a rectifier circuit providing a level 3 DC EV charger with DC output. Therefore, the user will have the option of choosing between the level 2 AC EV or level 3 DC EV chargers.

Figure 8C:
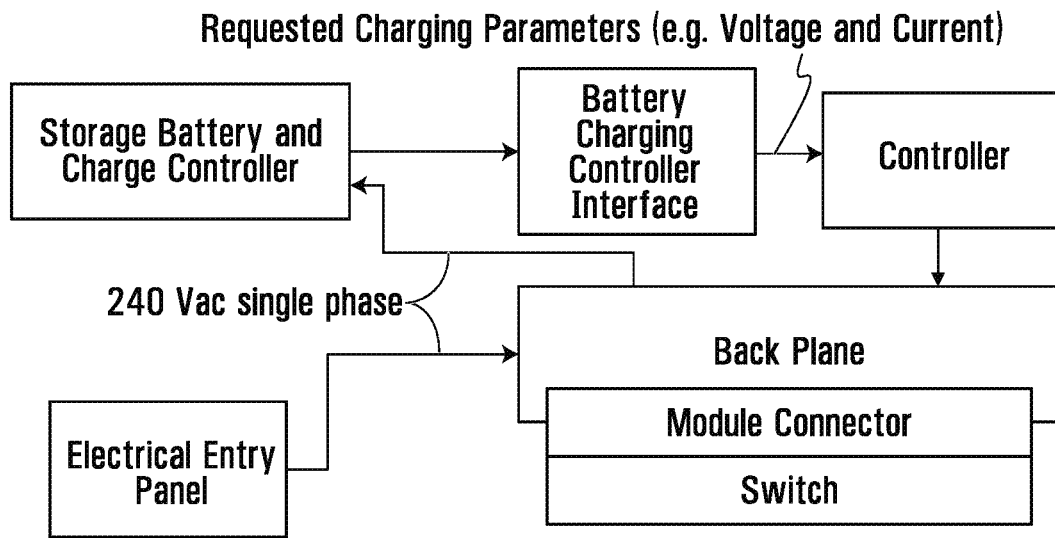
FIG. 8C is a block diagram showing an embodiment of a charger having a switch connected to its backplane providing an AC output.

FIG. 8C illustrates an embodiment in which the backplane can receive the connector or switch directly or through a module connector. When the switch is connected to the backplane, the charger will have an AC output going to the storage battery providing the user with a level 2 AC EV battery charger.

Figure 8D:
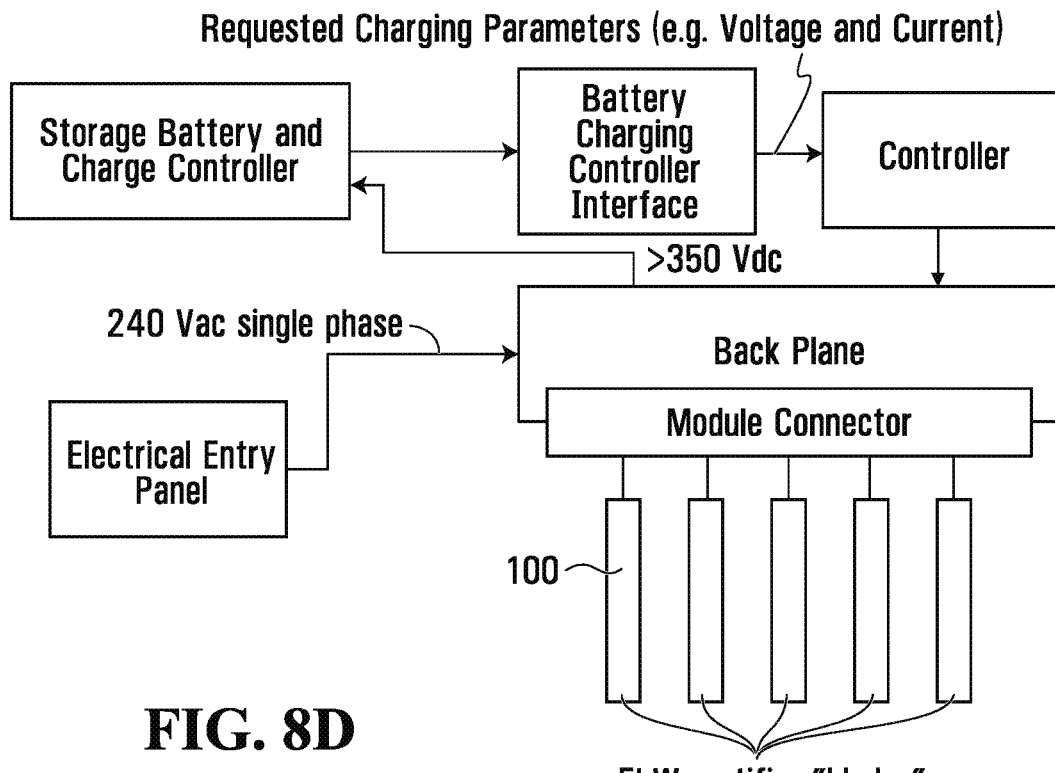
FIG. 8D is a block diagram showing the embodiment FIG. 8C wherein the switch is replaced by a modular converter battery charging system.

FIG. 8D shows the same embodiment as FIG. 8C wherein the switch is physically removed from the module connector by a user, hence disconnecting the AC current to the AC output and is replaced by one or more battery charger rectifiers such as module 100 at a later time, hence upgrading the charger to a level 3 DC EV charger. This provides the user to install the cheaper level 2 AC EV battery charger which works with all types of vehicles but is not as fast or efficient in charging the vehicle knowing that it could be easily upgraded to a much faster and more efficient Level 3 DC EV.

In some embodiments, as demonstrated in FIG. 11C, the switch can have the form of a blade 1100 having a surcharge prevention module and connect to the backplane directly or through the module connector similarly to the rectifier blades 100. In this embodiment, the used has to remove blade 1100 in order to replace it with the rectifier blade 100.

It will be appreciated by those skilled in the art that any kind of connector can be used as a backplane and the purpose of module connector is only to facilitate and simplify the installation process for the user and any kind of connector can be used as the backplane. Furthermore, in some embodiments, the switch and backplane can be the same element having the ability to disconnect the AC output and redirect the current to the rectifier circuit.

Furthermore, it will be appreciated by those skilled in the art that even it has been illustrated differently but the controller 830 and/or the battery charger controller interface 820 or other elements of the charger may be also provided as add-on module or blades similar to the rectifier blade 100 that can be added to the device at a later date. Hence, the original charger may be only a backplane with an input and output that is upgradable to a DC charging station only by adding some modules or blades on the backplane.

Moreover, it will be understood by those skilled in the art that the AC and DC outputs can use separate or same physical outlet or cable. In some embodiments, the outlet is capable of communicating with the vehicle's charge controller.

Figure 9:
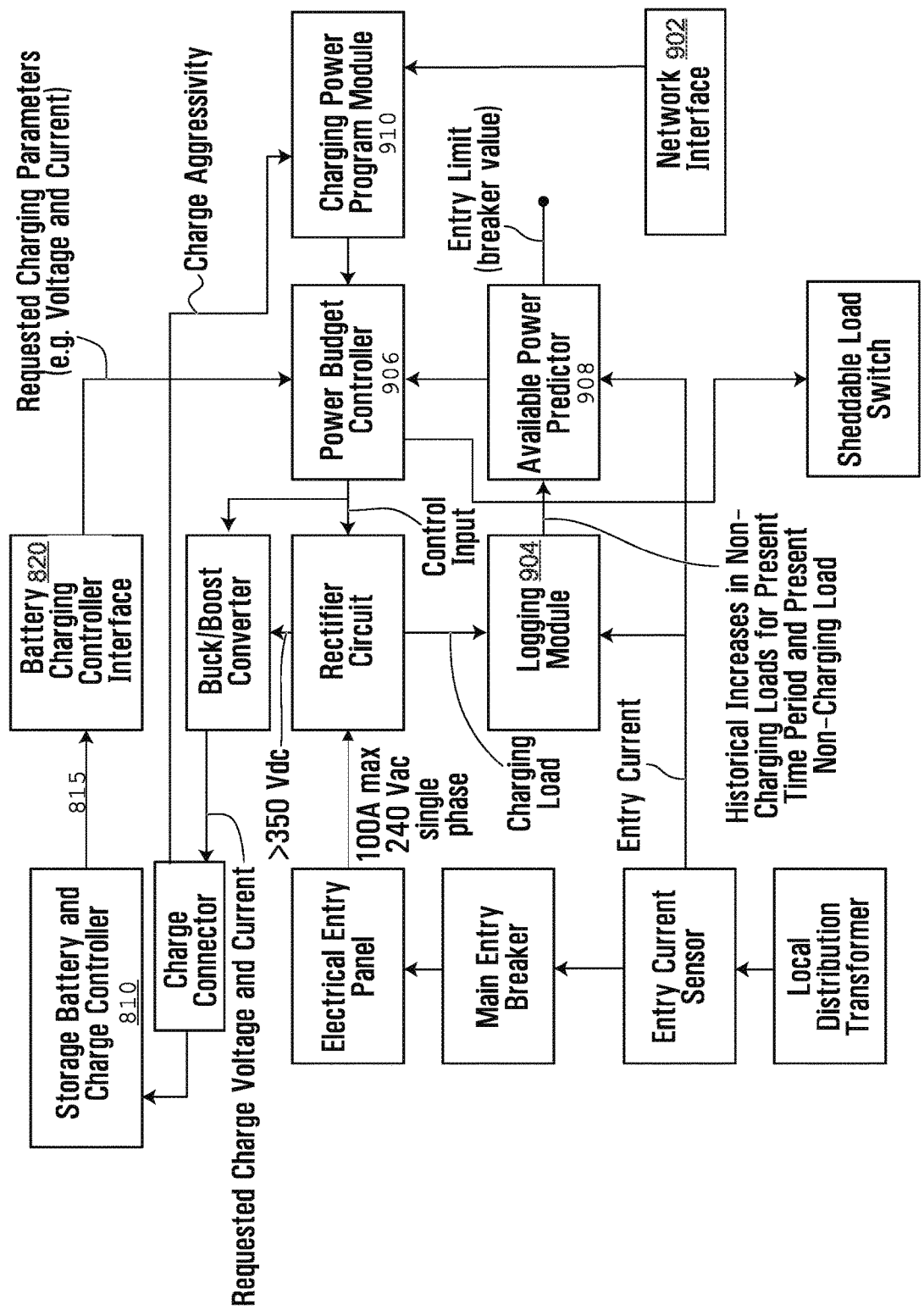
FIG. 9 is a block diagram showing a charging power budget controller.

FIG. 9 is a block diagram showing a battery charger for an electric power storage battery. An electrical entry is connected to a local distribution transformer of a power grid via a sensor and a main breaker having a predetermined current threshold. The sensor provides a value of current drawn by the electrical entry. A battery charging controller interface communicates with the electric power storage battery and receives a charge voltage value and a desired charge current value. A rectifier circuit is connected to the electrical entry for receiving AC input power, and it outputs a DC voltage that can be either down or up converted using, for example, a DC buck-boost converter circuit. The buck converter has a control input defining an output DC voltage and current. As illustrated in FIG. 10A, the controller 410 can control the buck-boost converter to output the desired DC voltage and current.

In one broad aspect, the present disclosure provides a power converter connected to an AC input converting power from said AC input to DC comprising at least one high-voltage capacitor for storing power at a voltage boosted above a peak voltage of said AC input, a rectifier circuit. The rectifier comprises an inductor connected in series with said AC input, a low-voltage capacitor, and either two diodes connected between or alternatively two high-voltage switches connected between a first AC input terminal and opposed ends of said high-voltage capacitor, two intermediate low-voltage power switches connected between said opposed end of said high-voltage capacitor and opposed ends of said low-voltage capacitor, and two terminal low-voltage power switches connected between said opposed ends of said low-voltage capacitor and a second AC terminal, wherein a DC load can be connected to said opposed ends of said high-voltage capacitor. The power convertor further a modulator receiving a reference signal from a controller and working with a state selection module enforcing a predefine switching technique to provide state selection signals indicative of respective states of said two high-voltage, said intermediate low-voltage, and said two terminal low-voltage power switches pulse generator.

In some embodiments, the controller is operative for causing the rectifier circuit to operate in a boost mode wherein a voltage of said high-voltage capacitor is higher than a peak voltage of said AC input, and said two intermediate low-voltage power switches and said two terminal low-voltage power switches are switched with redundant switching states in response to a measurement of a voltage present at the low-voltage capacitor so as to maintain said low-voltage capacitor at a predetermined fraction of a desired voltage for said high-voltage capacitor and to thus maintain said high-voltage capacitor at a desired high voltage, with said rectifier circuit supplying said DC load and absorbing power as a five-level active rectifier with low harmonics on said AC input.

In some embodiments, the power convertor instead of a rectifier circuit has a bidirectional rectifier/inverter circuit and two controllers instead of one to be able work bidirectionally as a rectifier and inverter. The bidirectional rectifier/inverter circuit comprises an inductor connected in series with an AC port, a low-voltage capacitor, two high-voltage power switches connected between a first AC terminal and opposed ends of said high-voltage capacitor, two intermediate low-voltage power switches connected between said opposed end of said high-voltage capacitor and opposed ends of said low-voltage capacitor, and two terminal low-voltage power switches connected between said opposed ends of said low-voltage capacitor and a second AC terminal, wherein a DC port can be connected to said opposed ends of said high-voltage capacitor. The power convertor further comprises a first controller for a rectifier mode having at least one sensor for sensing current and/or voltage in said bidirectional rectifier/inverter and connected to a gate input of said two high-voltage power switches, said two intermediate low-voltage power switches and said two terminal low-voltage power switches for causing said rectifier circuit to operate in a boost mode wherein a voltage of said high-voltage capacitor is higher than a peak voltage of said AC input, and said two high-voltage power switches are controlled to switch on and off at a frequency of said AC input, and said two intermediate low-voltage power switches and said two terminal low-voltage power switches are switched with redundant switching states in response to a measurement of a voltage present at said low voltage capacitor so as to maintain said low voltage capacitor at a predetermined fraction of a desired voltage for said high-voltage capacitor and to thus maintain said high voltage capacitor at a desired high voltage, with said rectifier circuit supplying said DC load and absorbing power as a five-level active rectifier with low harmonics on said AC input. The power convertor also has a second controller for an inverter mode connected to said two high-voltage power switches, said two intermediate low-voltage power switches and said two terminal low-voltage power switches and configured to generate and apply to said two high-voltage power switches, said two intermediate low-voltage power switches and said two terminal low-voltage power switches signal waveforms comprising a first control signal for causing said low-voltage capacitor to be series connected with said DC port and said AC port and charged to a predetermined value proportional to a Voltage of said DC port, and a second control signal for causing said low-voltage capacitor to be disconnected from the DC port and series connected with the AC port, thereby causing the low-voltage capacitor to be discharged.

In FIG. 9, the network interface 902 can be a conventional data interface, such as ethernet, Wi-Fi, etc., associated with the computer 830. The logging module 904, power budget controller 906, available power predictor 908 and the charging power program module 910 can be implemented in software stored in the memory of computer 830 and executed by a processor of computer 830 to perform the operations as described below.

A logging module stores in a memory at least one parameter derived from the current drawn as measured by the sensor, less any power drawn by the rectifier circuit over time for various sub-periods within each day. This parameter can be the greatest probable increase in non-charging loads for the present time period and the present non-charging load. Jumps in load can be derived from one or more appliances turning on. AC motors, such as heat pump and air conditioning compressor motors, typically draw at least twice their steady-state current when starting. As can be appreciated, the probability of an increase in power drawn can be within a desired likelihood, such as within 97% probability.

An available power predictor calculator receives the current drawn value and the logging module parameter and provides a maximum charge load value as a function of a predetermined electrical entry maximum power load. The maximum load value for the electrical entry can be set using a user interface (not shown). A power budget controller receives the maximum charge load value and, from the battery management interface, the desired charge voltage value and desired charge current value and provides the control input to the rectifier circuit.

In one embodiment, the greatest probable increase is determined based on long-term observation data. Until such data is acquired, the available power predictor may behave more conservatively, and as the certainty increases about the prediction, the predictor calculator can be more aggressive.

In another embodiment, the variations in power consumption are analyzed to determine the number and sizes of the main household loads. A behavior pattern for these loads is then detected. Loads that are estimated to be on, can only be turned off, and so they do not contribute to a risk of increasing the total load. The probability that a load will turn on is based on the state of other loads, time of day and time of year. For example, if a water heater is off, there can be a higher likelihood that it will turn on at any given moment from 7 AM to 8 AM due to water usage than from 11 PM to 6 AM. In summer, electric heating loads are unlikely to turn on, while AC is more likely, and the opposite may hold true in winter. Based on behavior patterns and the current estimate of what loads are on, the available power predictor can predict the greatest probable immediate increase in power.

The power budget controller considers the risk of the greatest probable increase in power to determine what power is available to the charger for consumption, and the power budget controller causes the rectifier circuit and/or the DC-DC downconverter to adjust DC power delivered to the EV when the requested power would be too great.

Furthermore, the power budget controller can consider battery degradation when setting the charging rate. This can involve referencing a predetermined maximum charge current or power value. As described below, a user-selected charge aggressivity level can also be referenced.

When the available power predictor module forecasts that an increase in power is probable that could risk exceeding the power budget (entry limit), an optional sheddable load switch can be used to prevent a significant load from drawing power that can result in exceeding the power budget. This can delay or shift the added load to avoid exceeding the power budget of the electric entry. The sheddable load switch can include a line voltage power switch connected between one or more electrical loads and the electrical panel, for example, a water heater, to prevent the load from drawing current from the electrical panel with the risk that such additional load could exceed the power budget. Preferably, the load switch includes a sensor, for example, a current sensor, to measure whether the load is currently drawing power. In this way, the power budget controller can detect if the load in question is drawing power. The sheddable load switch, when open, can be equipped with sensors to detect when the disconnected load is looking to draw power, and in this case, the power budget controller can then decide to reconnect the load after reducing DC charging power accordingly.

Some loads that draw high current include control electronics that draw a small load in a stand-by state, for example, less than about 100 watts. In this case, it is possible to include by-pass low power AC to the sheddable load while the sheddable load switch is open. An example of a low power AC by-pass connection is an isolation transformer configured to provide about ten to several tens of watts of power for the electronics of the sheddable load. When the load switches on, the sheddable load switch module can detect the draw of power on the load side of the isolation transformer and then signal the power budget controller to decide whether to reduce DC charge power to allow the sheddable load to be reconnected to full AC power, or whether DC charging at the same rate should continue. When DC charging load demand is over and then permits, the sheddable load can be reconnected.

The embodiment in FIG. 9 includes a charging power program module that responds to user input to curb the charge rate when the user is not in a rush to charge the EV. While EV's can permit fast charging, and embodiments disclosed herein can allow for charging with powers of about 25 kVA, battery life can be reduced by repeated fast charging. Additionally, the charging power program module may be used to select a time program for charging, namely to delay and/or otherwise tailor power consumption in accordance with time-variable energy costs and/or the availability of power within the distribution network. The charging connector can, for example, provide a user interface for selecting a charge aggressivity level, namely a variable level of charge rate when the battery requests high rate charging. Alternatively, a network interface can be provided to allow a remote user interface to be used to set charging power program parameters.

In some embodiments, the AC current entering from the electrical entry panel can be redirected by a user through a connector such as a switch to an AC output and from there directly to the storage battery and charge controller circumventing the rectifier circuit hence providing the user with the option of choosing both AC or DC charging mode. In an alternative embodiment, the battery charger does not have the rectifier circuit but has a backplane to which the rectifier circuit can be added at a later time providing the user with a level 2 AC EV battery charger which is upgradeable to a level 3 DC EV charger for delivering power to an electric power storage battery.

It will be appreciated by those skilled in the art that the backplane disclosed herein can be a simple connector, a backplane having control units such as power budget controller, available power predictor, network interface and charging power program module embedded in it, or a backplane with module connectors to which said control units can be added.

FIG. 10A illustrates schematically a single "blade" 100 of the modular system illustrated in FIG. 8A. In the embodiment illustrated, a printed circuit board is provided along one edge with high-voltage AC and DC connectors as well as connectors for a data interface. The blade 100 contains the power switches for the power converter, and in this embodiment, there are six switches S1 to S6 for the 5-level active rectifier and one switch S7 for the buck-boost converter providing respectively DC to DC down or up conversion.

The capacitor 120 is provided on a small module that has a socket for connecting into a plug on blade 100. The quality of the high-voltage capacitor 120 can be important for the proper and safe operation of the rectifier. Timely replacement can, therefore, be advisable. The socket can include an identification circuit that can be read by controller 410 to determine a variety of information. First, it can be used to determine whether or not a new capacitor has been installed as required. Second, it can be used to determine whether the capacitor installed has been previously used. This can be achieved in a variety of ways. For example, the controller 410 can report to an external database the usage of each capacitor 120 as identified by its unique ID. Such a database can be queried when a new capacitor is plugged in. Alternatively, the identification circuit within the capacitor plug module can store information about usage in a non-volatile memory that can be read by controller 410. In this way, when a new capacitor module is connected to a blade 100, the controller 410 can determine if capacitor 120 should be considered to be fully new, partly used, or expired. In the case of an expired capacitor 120, the controller 410 can refuse to provide power and issue a warning to prompt replacement of the capacitor 120.

It will be appreciated that the manner of providing connectivity to a blade module 100 can use cable connectors instead of the edge connection shown. It will also be appreciated that the capacitor module's socket can be provided on the blade 100 as shown in FIG. 10A, or it can be provided elsewhere, such as in a separate portion of the backplane (see FIG. 8A).

The socket can include a switch to detect that the capacitor plug module is being removed or is exposed for removal, so that powering down of the blade or blades 100 can be done to allow for safe removal and replacement of the capacitor modules 120. While each blade 100 is shown in the embodiment of FIG. 10A to have its own controller 410, it is possible to have a common controller 410 on the back plane control the switches from a number of blades.

The sensor block in FIG. 10A is illustrated as being connected to measure the voltage at the low-voltage capacitor, the DC output current ad the DC output voltage. Other values can also be measured if desired. The values measured are provided to the controller 410.

The power conversion circuit 100 may be provided in a power conversion apparatus alongside other parallel power conversion circuits of like construction, as illustrated in FIG. 10A, each working in parallel to provide DC or AC power to different loads. To this end, the power conversion apparatus may comprise a housing including a connector backplane having a number of sockets or connectors for receiving a plurality of power conversion circuit modules each comprising a power conversion circuit 100 of the type described herein, although, in one embodiment, a common controller can be used for all of the modules. An advantage of this modular approach can be that a backplane can be first installed, possibly using the services of a professional electrician, while an end-user may add or replace the modules 100 as required. The modular approach illustrated is not limited to any particular number of modules 100; however, Applicant has found that in particular using the power conversion circuit design described hereinabove, that a 5 kW rectifier module is efficient, and 6 of such modules provides a combined DC charging power of about 30 kW. This amount of power is suitable for high-speed battery charging while being feasible within the available power budgets of most conventional electrical entries.

For practical implementation, a power conversion apparatus comprising the power conversion circuit 100 may comprise a user-interchangeable DC vehicle charging cable and charging plug, e.g., having a compatible format for fitting a standardized plug/socket (i.e., SAE J1772, ChaDeMo, or other) in an EV.

As illustrated in FIG. 10A, in one embodiment, the power converter module 100 has an integrated switching capability. Bidirectional switches BS1, BS2, BS3, BS4, BS5, and BS6 along with relays RE1 and RE2 allow the power converter module 100 to perform the switching between multiple DC ports 802, 804 and 806 and the AC port 808 on-board without needing any external switching. The ports 812 and 814 are used to connect the power converter module 100 to its off-board components in this example being the inductive filter/inductor 110 for port 814 and a buck/boost inductor 816.

Figure 10B:
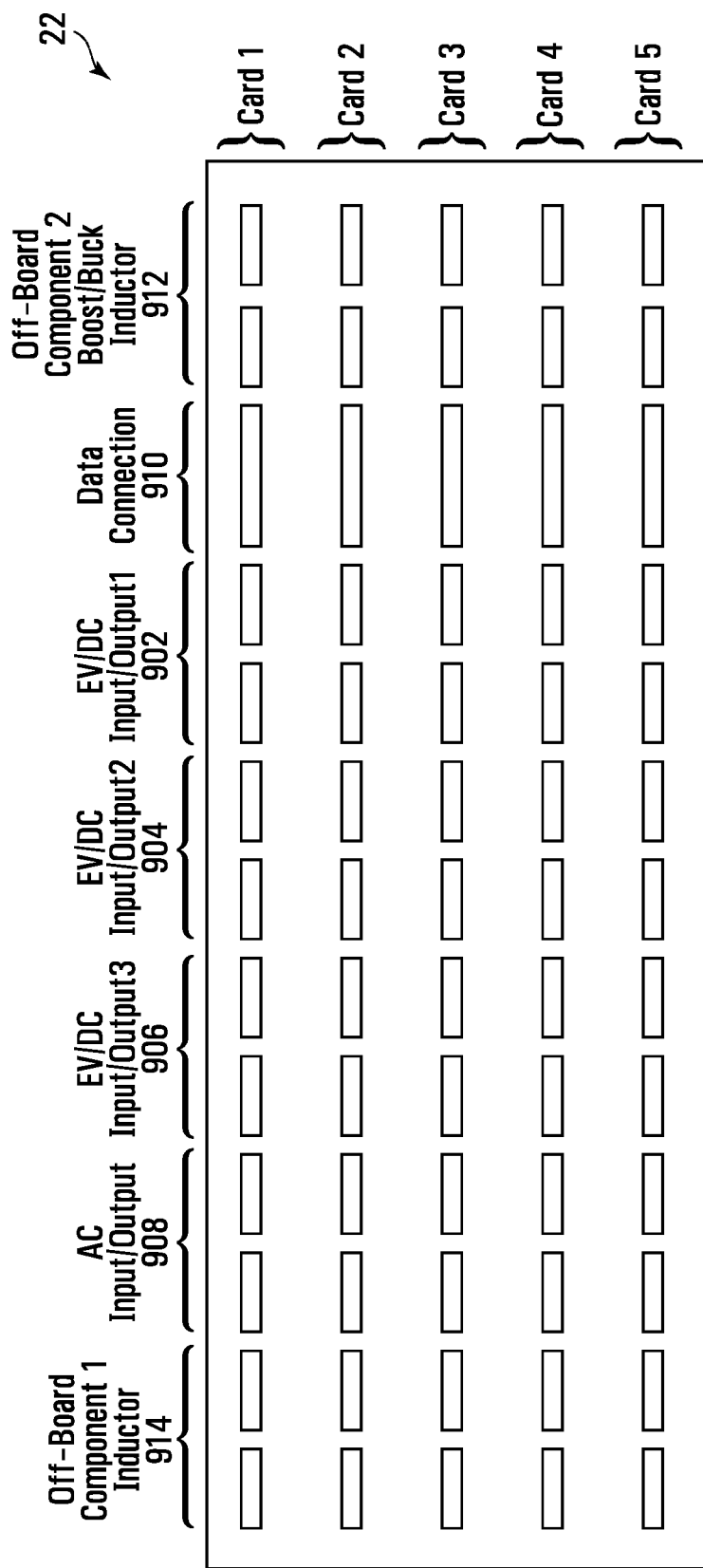
FIG. 10B is a schematic diagram of a backplane in accordance to one embodiment of the present invention having connectors for five power converter module.
Figure 10C:
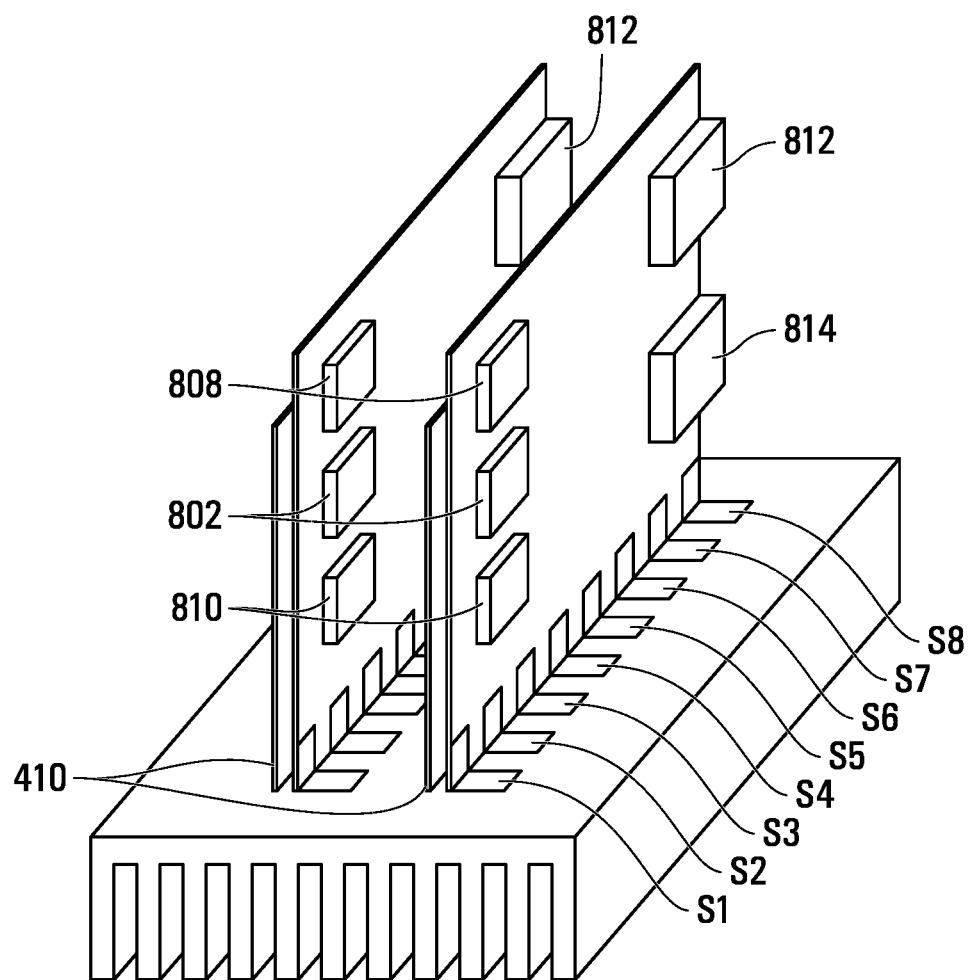
FIG. 10C is a schematic diagram of a two power converter modules in accordance with one embodiment of the present invention with the switches assembled on a heat sink to provide required cooling for the switches.

FIG. 10B shows an example of a backplane 22 that may be used by the power converter module 100 shown in FIG. 10A. As explained, in this embodiment, all the switching can be done on-board the module and the backplane may be only connecting similar ports of the cards 1 to 5 to each other and to the power conversion apparatus ports. There are five series of connectors for cards 1 to 5 and each series of connectors has connectors 912, 910, 902, 904, 906, 908 and 914 which receives respectively ports 812, 810, 802, 804, 806, 808 and 814 of the power converter module 100. In one embodiment, all similar ports of different cards may be connected to each other. For example, all ports 902 of cards 1 to 5 may be connected to each other.

It will be appreciated by those skilled in the art that, although in this embodiment necessary switching exists on module 100 but the backplane 22, in some embodiments, may benefit from additional switching to connect ports to each other in a different order and combination.

It will be appreciated by those skilled in the art that any kind of connector can be used as a backplane and the purpose of module connector is only to facilitate and simplify the installation process for the user and any kind of connector can be used as the backplane.

As illustrated in FIG. 100, in some embodiments, it may be beneficial for the power conversion circuit 100 blades to be connected or mounted on a heat sink so that the switches S1 to S8 positioned at the edge of the circuit blade or module 100 are connected to the heat sink, therefore, providing better cooling for the heat sink and the ports are on the board. The AC, DC and Data port 808, 802 and 810 may be connected to the corresponding ports via cable instead of using the backplane 22.

Furthermore, the controller 410 has its own separate circuit which connects to the module through a port (not shown in the drawing) on the back of the converter module/circuit board.

In some embodiments the connection of the switches may be use a thermal interface material to provide better cooling. The thermal heating material may be any of the material commonly known and used in art.

In some embodiments, the converter apparatus does not have the backplane 22 with sockets receiving the modules. The ports 812, 810,802,804, 806, 808 and 814 can be directly connected to the AC and DC ports as well to the ports of the offboard inductors 110 and off-board inductor 16 on the panel 20.

Figure 11A:
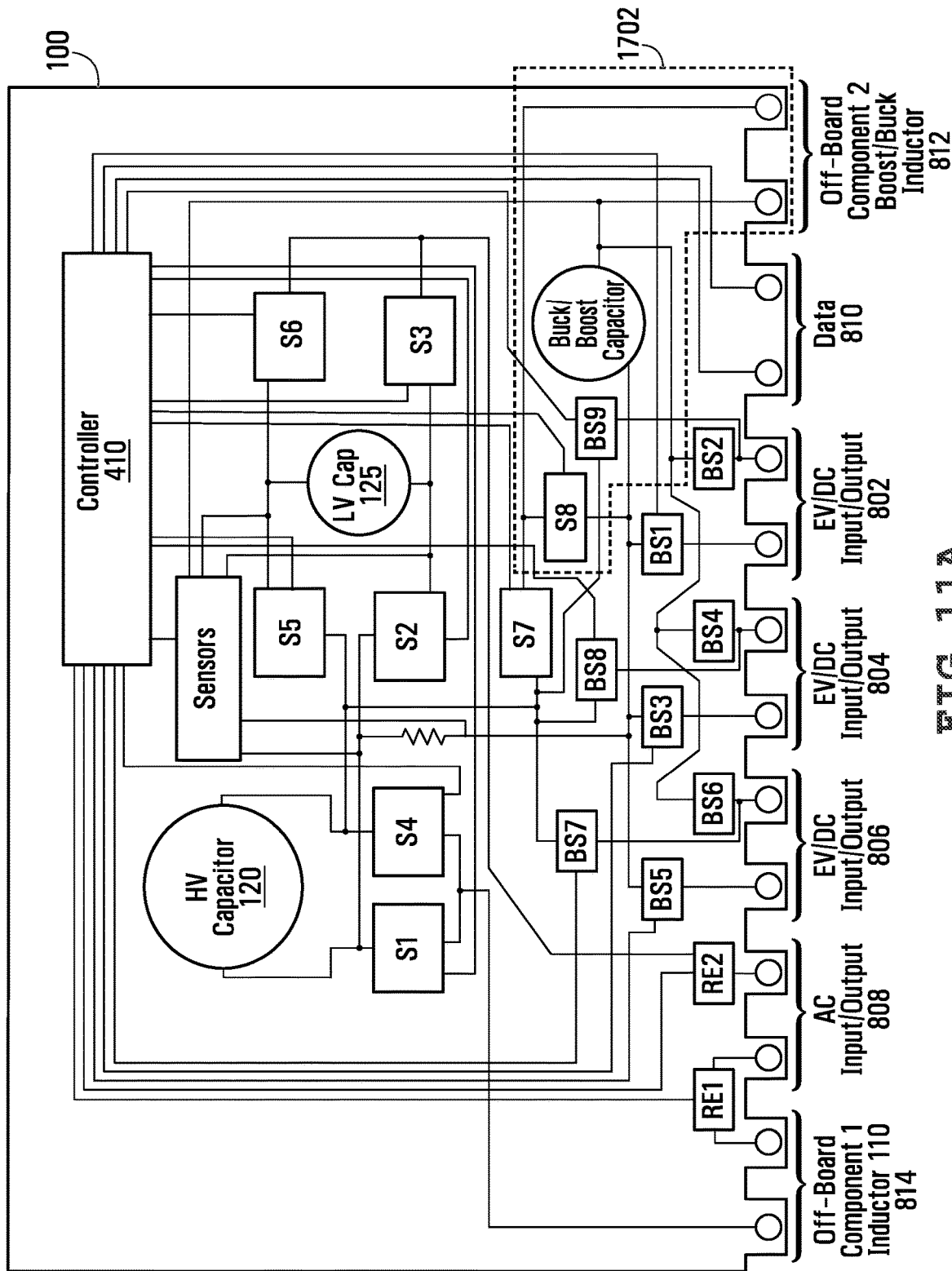
FIG. 11A is a schematic illustration of a power converter module with integrated switching capability and integrated DC to DC converting capability in accordance with one embodiment.

Referring to FIG. 11A, it illustrates a different embodiment of the power converter module 100 with integrated switching capability and integrated DC to DC converting capability between three DC 802, 804 and 806 using additional bidirectional switches BS7, BS8, and BS9. In this embodiment, the module 100 may receive DC current from any of the DC ports (it can be from an EV battery, solar panel, reserve battery or any other DC source) pass it through on-board buck-boost circuit 1702 and give to any of other DC ports. This can be achieved using a combination of switches BS1 to BS9. In one example, the DC port 802 receives a DC current from EV1. The controller 410 opens BS2 and closed BS9 to direct the current towards the buck/boost circuit 1702. The output current of buck/boost circuit may be any variable DC voltage which is then directed to any other desired DC port, here DC port 804, by opening BS6 and BS2.

It will be appreciated by those skilled in the art the same switching mechanism may be located on the backplane or a different module providing the same type of DC-DC charging. The buck-boost circuit 1702 may be equally located on the backplane or a separate module to achieve the above-explained result.

Figure 11B:
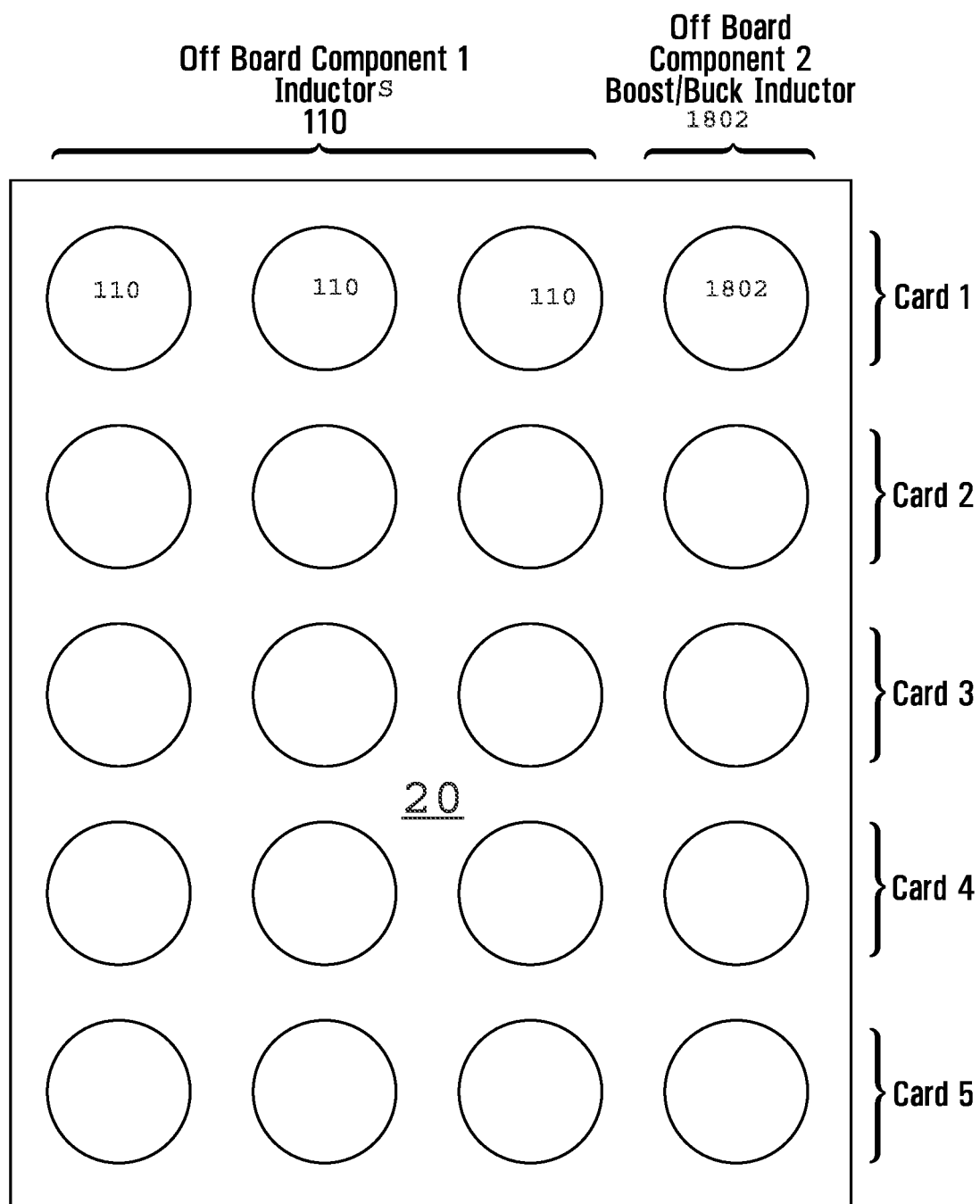
FIG. 11B is a schematic illustration of an off-board component board having offboard components of five power converter module according to one embodiment.

Referring now to FIG. 11B, it illustrates an off-board component board 20 having off-board components, in this embodiment, the buck/boost inductor 1802 and the inductor 110, of five power converter modules 100. The board 20 may be connected to the backplane directly or have a modular connection to the backplane. Similarly, the off-board component may be fixed permanently on the board or have sockets/connectors allowing them to be replaced or changed.

It will be appreciated by those skilled in the art that any type of rectifier, inverter or rectifier/inverter may be used in combination to provide the desired AC and DC outputs as described herein. An example of such conversion circuits may be a multi-level rectifier/inverter circuit.

It will be appreciated by those skilled in the art that the power conversion apparatus and the circuitry described in this application such as the 5-level rectifier circuit can be used in any AC to DC conversion systems such as a DC supply, other EV chargers, any other type of battery apparatus, or any other implementation requiring AC to DC conversion.

FIG. 11C shows a schematic diagram of an alternative embodiment of the present invention in which an AC charging blade 1100 with a surcharge prevention module 1102 is disclosed. The AC current enters the blade from an AC input and exits from an AC output after going through the surcharge prevention module 1102. The surcharge prevention module further provides the possibility to communicate with the charging controller interface to set up the current and voltage for the AC output as required by the EV by use of a date port.

Figure 12:
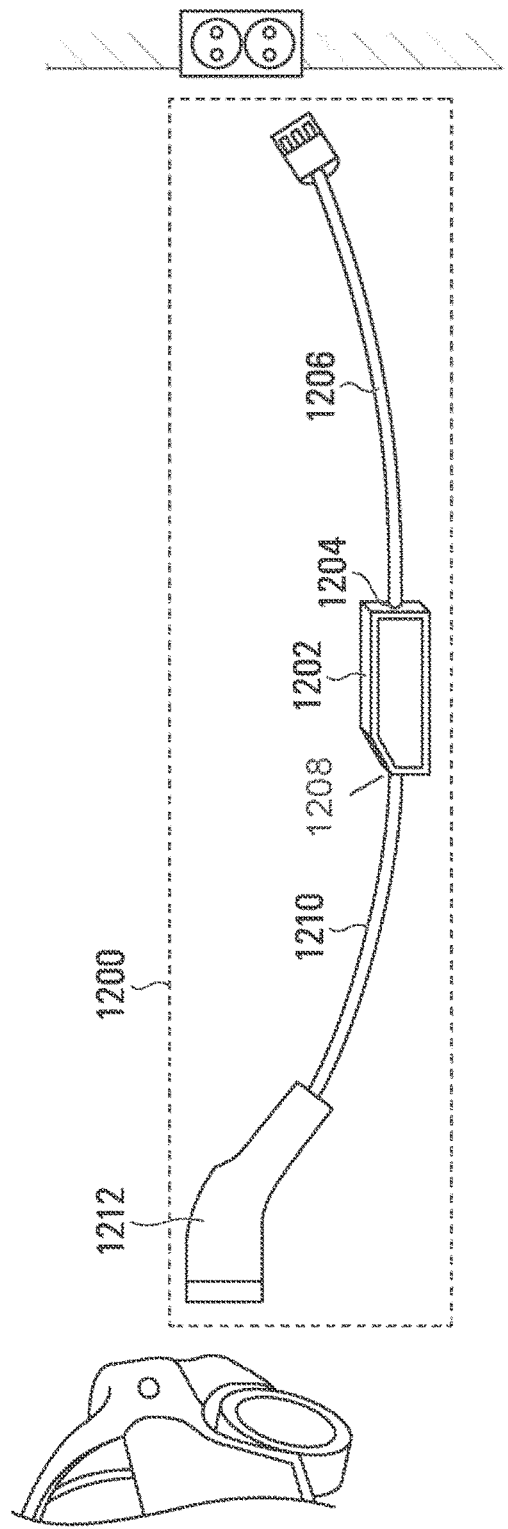
FIG. 12 is a schematic illustration of the physical installation of a portable EV charging system including a charge cable extending between the charger and an electric vehicle (EV) with having a battery rectifier unit between the EV and the charger.

Referring to FIG. 12, there is illustrated an embodiment of the present invention in which a portable DC charging unit 1200 is provided. The portable DC charging unit comprises a housing 1202 having an AC input 1204 and a DC output 1208 that are respectively connected to an AC source 1204 by a cable 1206 having a connector (i.e., a plug or socket) at one end and to an EV by a cable 1210 having an EV connector 1212 at one end for connecting to a DC charge port of the EV. The portable DC charging unit 1200 is provided with one or more 5-level rectifier circuit.

Figure 13:
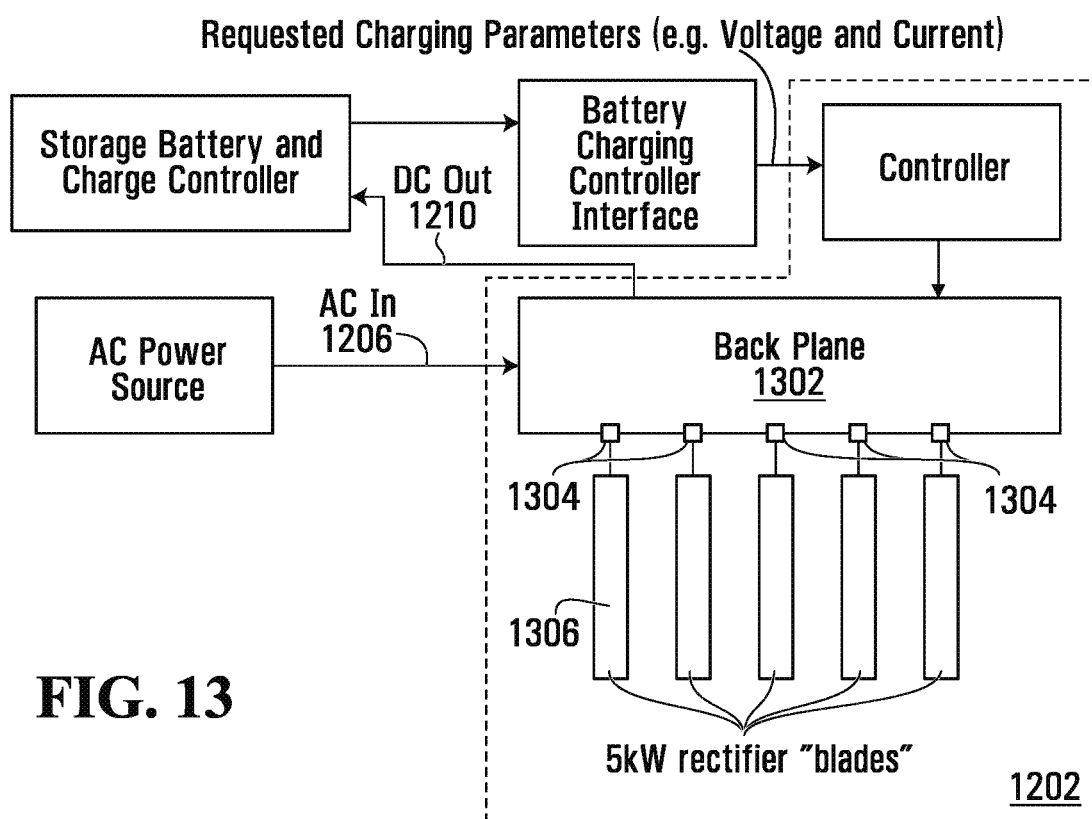
FIG. 13 is a block diagram showing the portable EV charging system in FIG. 12.

In one embodiment, the portable DC charging unit 1200 is provided with multiple 5-level parallel battery charger rectifier circuits of like construction, illustrated in FIG. 13, each working in parallel to provide DC power to the load. To this end, the battery charger may comprise the housing 1202 may include a connector backplane 1302 having a number of sockets 1304 for receiving a plurality of blade modules 1306 each comprising a 5-level battery rectifier circuit of the type described herein.

An advantage of this modular approach can be that the portable charger can be sold only with one 5-level rectifier circuit and an end-user may add or replace the modules 1306 as required. The modular approach illustrated is not limited to any particular number of modules 1302.

In some embodiments, the portable charger unit may work in a bidirectional mode or a unidirectional mode. In the bidirectional mode, the portable charger can work either as an inverter or a rectifier. In the unidirectional mode, the converter works a rectifier as described before in other embodiments of the present invention.

In the unidirectional mode, the 5-level rectifier circuit can have two diodes instead of the two high-voltage switches as illustrated in FIG. 2D.

One advantage of the portable charging unit 1200 is that unlike on-board charging units, it has a close to unity power factor, drawing low harmonic AC current from the utility/source. Furthermore, in some embodiment, the portable charger unit 1200 may provide the capabilities of any other off-board charging units such as higher KW transfer, more sophisticated battery management system, managing battery heating, ability to communicate to building/home/grid, energy management systems, a higher the energy transfer rate. Also, the disclosed portable charging unit 1200, can further give the EV manufacturers the option to remove weight from EV by removing the on-board charging unit and providing the portable charging unit 1200 as an alternative for charging the vehicle.

Figure 14A:
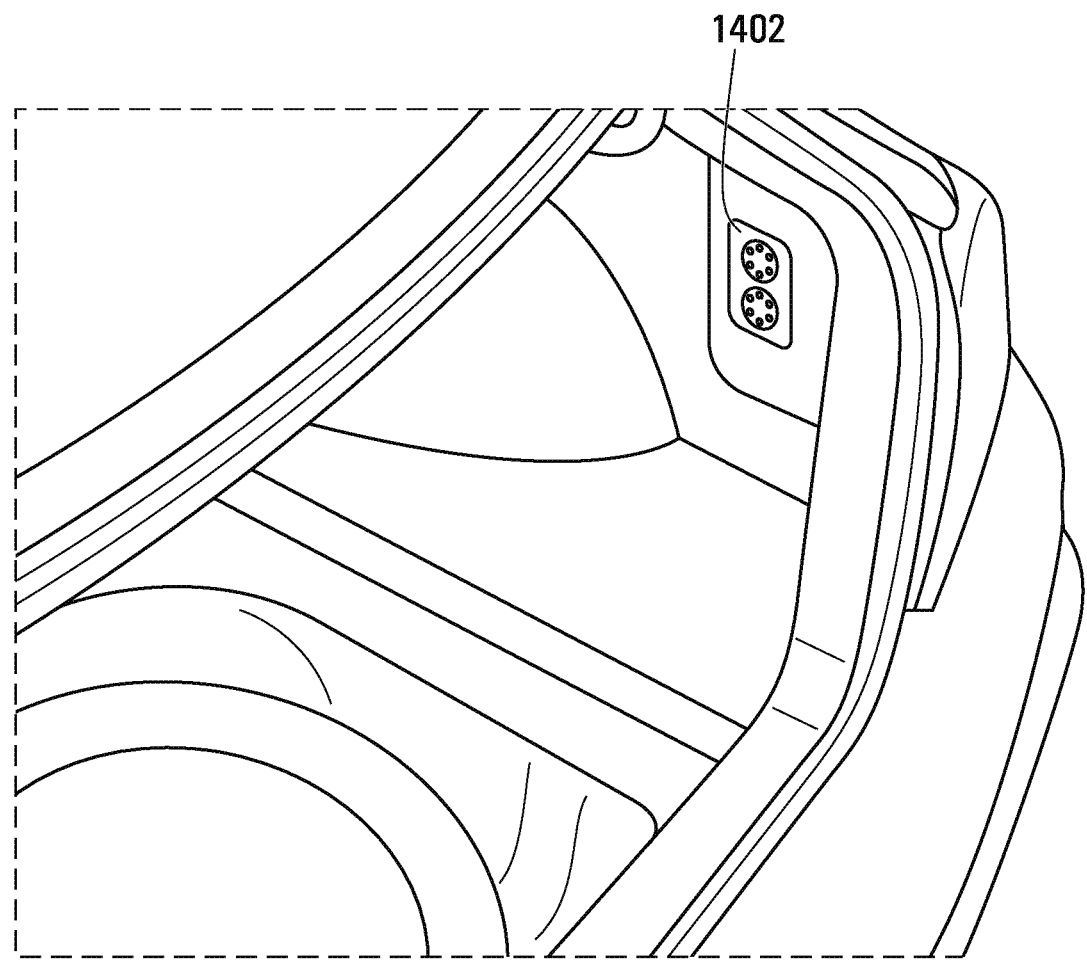
FIG. 14A is a schematic illustration of a comportment for storing the portable EV charging system having a receptor according to a particular example of implementation.
Figure 14B:
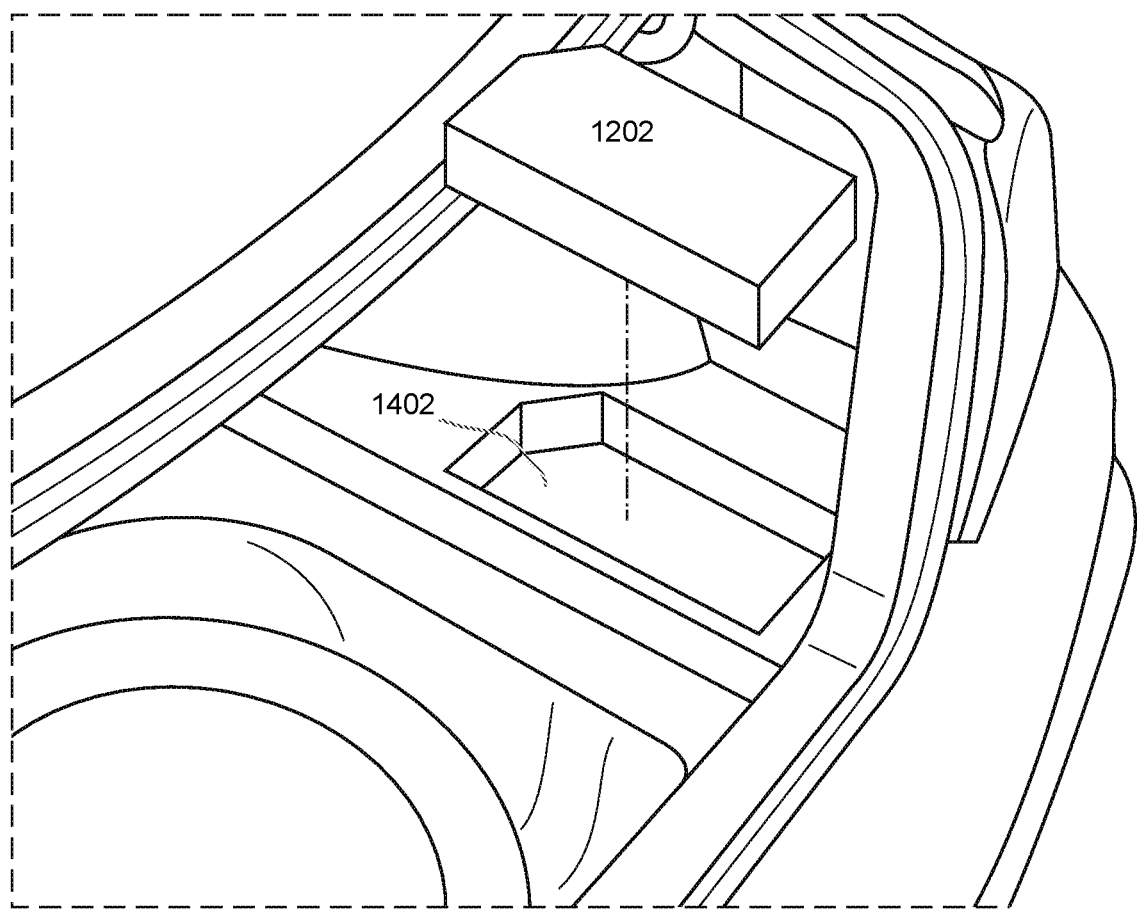
FIG. 14B is a schematic illustration of a comportment for storing the portable EV charging system having a receptor according to a particular example of implementation.

Referring to FIGS. 14A and 14B, in some embodiments, the electric vehicle can have a receptor 1402 in its trunk for a connector 1212 having a sensor (not shown) connected to an indicator for the driver showing the presence of the portable DC charging unit in the trunk of the vehicle. This would prevent the user to forget the portable charging unit after the charge is over or upon leaving a place. The sensor can be as simple as a mechanical switch that is pushed when the receptor 1402 receives the connector or any other type of mechanical, electrical or electronic sensor known in the art.

In some embodiments instead of the receptor 1402, the electric vehicle has a different receptor or compartment 1402 (see FIG. 14B) for receiving the housing 1202 or the cable of the portable DC charging unit 1200 that provides the same indicating function.

In one embodiment, instead of the receptor 1402, the portable charging unit 1200 may have a wireless presence indicator such as a Radio-frequency identification (RFID) or Bluetooth sensor to indicate the presence of the portable DC charger within or in the proximity of the vehicle.

It will be appreciated by those skilled in the art that the circuitry described in this application such as the 5-level rectifier circuit can be used in any AC to DC conversion systems such as a DC supply, other EV chargers, any other type of battery charger, or any other implementation requiring AC to DC conversion.

With reference to FIG. 10A, it will be understood that the controller 410 also controls a DC to DC buck or boost converter in response to the desired output DC voltage requested. In FIG. 10A, this is a simple buck or boost converter controlled by switch S7 using the feedback of the measured DC output voltage using a sensor.

It will be appreciated by those skilled in the art that any type of buck or boost or buck-boost converter known in the art can be used without affecting the manner in which the invention works. Two important topologies are called buck-boost converter which can produce a range of output voltages, ranging from much larger (in absolute magnitude) than the input voltage, down to almost zero.

The first topology is the inverting topology in which the output voltage is of the opposite polarity than the input. This is a switched-mode power supply with a similar circuit topology to the boost converter and the buck converter. The output voltage is adjustable based on the duty cycle of the switching transistor.

The second topology is a buck (step-down) converter combined with a boost (step-up) converter in which the output voltage is typical of the same polarity of the input, and can be lower or higher than the input. Such a non-inverting buck-boost converter may use a single inductor which is used for both the buck inductor mode and the boost inductor mode, using switches instead of diodes.

Although the above description has been provided with reference to a specific example, this was for the purpose of illustrating, not limiting, the invention.

What is claimed is:

1. A portable charger for delivering power to an electric vehicle (EV) having an electric power storage battery, wherein said portable charger comprises:
   a housing having a DC port connected to a first EV charging cable and an AC port connected to a second AC power cable having at one end a connector for connecting said portable charger to one of an AC power source or an AC power load;
   a battery charging controller interface connected to said first EV charging cable for communicating with the electric power storage battery and receiving a charge voltage value;
   a multi-level power converter connected to said AC port and responsive to said charge voltage value to convert AC power from said AC port to DC power at said DC port at a variable voltage according to said charge voltage value for a DC load.

2. The portable charger in claim 1, wherein said multi-level power converter is bidirectional and wherein said multi-level power converter further converts DC power from said DC port to an AC load at said AC port.

3. The portable charger in claim 1, wherein said second AC power cable is selected based on a desired AC voltage of said AC power source or said AC power load.

4. The portable charger in claim 1, wherein said multi-level power converter comprises:
   at least one high-voltage capacitor for storing power;
   a rectifier circuit comprising:
      an inductor connected in series with said AC port,
      a low-voltage capacitor,
      one of:
         two diodes connected between a first AC port terminal and opposed ends of said high-voltage capacitor; and
         two high-voltage switches connected between a first AC port terminal and opposed ends of said high-voltage capacitor,
      two intermediate low-voltage power switches connected between said opposed end of said high-voltage capacitor and opposed ends of said low-voltage capacitor, and
      two terminal low-voltage power switches connected between said opposed ends of said low-voltage capacitor and a second AC port terminal,
      wherein a DC port can be connected to said opposed ends of said high-voltage capacitor;
   a modulator receiving a reference signal from a controller;
   a state selection circuit receiving said at least one comparison signal and outputting a state signal;
   a switching pulse generator receiving said state signal and connected to gates of said power switches.

5. The portable charger in claim 4, further comprising at least one sensor connected to said modulator for sensing current and/or voltage in said rectifier circuit and connected to a gate input of said two intermediate low-voltage power switches and said two terminal low-voltage power switches.

6. The portable charger in claim 4, wherein said controller is operative for causing said rectifier circuit to operate in a boost mode wherein a voltage of said high voltage capacitor is higher than a peak voltage of said AC port, and said two intermediate low voltage power switches and said two terminal low voltage power switches are switched with redundant switching states in response to a measurement of a voltage present at said low voltage capacitor so as to maintain said low voltage capacitor at a predetermined fraction of a desired voltage for said high voltage capacitor and to thus maintain said high voltage capacitor at a desired high voltage, with said rectifier circuit supplying said DC port and absorbing power as a five-level active rectifier with low harmonics on said AC port.

7. The portable charger in claim 4, wherein said battery charging controller interface further communicates with the electric power storage battery and receives a desired charge current value and said power converter is further responsive to said desired charge current value to convert power from said AC port to DC at a DC port at a variable current not exceeding said desired charge current value for a DC load.

8. The portable charger in claim 4, further comprising a buck converter circuit for converting DC power from said opposed ends of said high-voltage capacitor to a lower DC output voltage set by said charge voltage value.

9. The portable charger in claim 4, further comprising a boost converter circuit for converting DC power from said opposed ends of said high-voltage capacitor to a higher DC output voltage set by said charge voltage value.

10. The portable charger in claim 4 wherein:

said rectifier circuit is a bidirectional rectifier/inverter circuit comprising an inductor connected in series with an AC port, a low voltage capacitor, two high voltage power switches connected between a first AC terminal and opposed ends of said high voltage capacitor, two intermediate low voltage power switches connected between said opposed end of said high voltage capacitor and opposed ends of said low voltage capacitor, and two terminal low voltage power switches connected between said opposed ends of said low voltage capacitor and a second AC terminal, wherein a DC port can be connected to said opposed ends of said high voltage capacitor;

said controller is a first controller for a rectifier mode having at least one sensor for sensing current and/or voltage in said bidirectional rectifier/inverter and connected to a gate input of said two high voltage power switches, said two intermediate low voltage power switches and said two terminal low voltage power switches for causing said rectifier circuit to operate in a boost mode wherein a voltage of said high voltage capacitor is higher than a peak voltage of said AC port, and said two high voltage power switches are controlled to switch on and off at a frequency of said AC port, and said two intermediate low voltage power switches and said two terminal low voltage power switches are switched with redundant switching states in response to a measurement of a voltage present at said low voltage capacitor so as to maintain said low voltage capacitor at a predetermined fraction of a desired voltage for said high voltage capacitor and to thus maintain said high voltage capacitor at a desired high voltage, with said rectifier circuit supplying said DC load and absorbing power as a five-level active rectifier with low harmonics on said AC port; and said power converter further comprises a second controller for an inverter mode connected to said two high voltage power switches, said two intermediate low voltage power switches and said two terminal low voltage power switches and configured to generate and apply to said two high voltage power switches, said two intermediate low voltage power switches and said two terminal low voltage power switches signal waveforms comprising a first control signal for causing said low voltage capacitor to be series connected with said DC port and said AC port and charged to a predetermined value proportional to a Voltage of said DC port, and a second control signal for causing said low voltage capacitor to be disconnected from the DC port and series connected with the AC port, thereby causing the low voltage capacitor to be discharged.

11. An electric vehicle (EV) in combination with a portable charger for delivering power to the electric vehicle having an electric power storage battery, wherein said portable charger comprises:

a housing having a DC port connected to a first EV charging cable and an AC port connected to a second AC power cable having at one end a connector for connecting said portable charger to one of an AC power source or an AC power load;

a battery charging controller interface connected to said first EV charging cable for communicating with the electric power storage battery and receiving a charge voltage value;

a multi-level power converter connected to said AC port and responsive to said charge voltage value to convert AC power from said AC port to DC power at said DC port at a variable voltage according to said charge voltage value for a DC load, wherein said electrical vehicle has a receptor or a compartment with a presence sensor showing the presence of a connector or a housing of said portable charger.

* * * * *